(12) United States Patent
Hioka et al.

(10) Patent No.: US 8,656,874 B2
(45) Date of Patent: Feb. 25, 2014

(54) CONTROL DEVICE OF ACTUATOR

(75) Inventors: Eiichi Hioka, Toyota (JP); Shunsuke Habara, Higashihiroshima (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 13/581,627

(22) PCT Filed: Jun. 7, 2011

(86) PCT No.: PCT/IB2011/001260
§ 371 (c)(1),
(2), (4) Date: Aug. 29, 2012

(87) PCT Pub. No.: WO2011/158083
PCT Pub. Date: Dec. 22, 2011

(65) Prior Publication Data
US 2013/0092111 A1    Apr. 18, 2013

(30) Foreign Application Priority Data
Jun. 14, 2010    (JP) .................................. 2010-135326

(51) Int. Cl.
*F01L 1/34*    (2006.01)
(52) U.S. Cl.
USPC ..................................... 123/90.15; 123/90.17
(58) Field of Classification Search
USPC .................................. 123/90.15, 90.17, 90.31
See application file for complete search history.

(56) References Cited

U.S. PATENT DOCUMENTS

| | | | |
|---|---|---|---|
| 5,522,352 A * | 6/1996 | Adachi et al. ............... | 123/90.15 |
| 2005/0039710 A1 | 2/2005 | Hashizume et al. | |
| 2005/0154522 A1 | 7/2005 | Fuwa et al. | |

FOREIGN PATENT DOCUMENTS

| | | |
|---|---|---|
| DE | 10 2007 000 250 A1 | 1/2008 |
| JP | 9-152902 | 6/1997 |
| JP | 2008-223705 | 9/2008 |
| WO | WO 2008/142555 A | 11/2008 |

OTHER PUBLICATIONS

International Search Report in International Application No. PCT/IB2011/001260; Mailing Date: Oct. 10, 2011.
Written Opinion of the International Searching Authority in International Application No. PCT/IB2011/001260; Mailing Date: Oct. 10, 2011.

* cited by examiner

*Primary Examiner* — Zelalem Eshete
(74) *Attorney, Agent, or Firm* — Finnegan, Henderson, Farabow, Garrett & Dunner, LLP

(57) ABSTRACT

An electronic control unit (100) detects the position of an output shaft (221) by counting a position count value based on pulse signals generated from position sensors (S4, S5) in accordance with rotation of a motor (210). The electronic control unit (100) determines that the motor (210) is in a predetermined rotational phase, based on the pulse signals generated from the position sensors (S4, S5). The electronic control unit (100) determines the number of revolutions that have been made by the motor (210) when the determination is made, based on the magnitude of current applied to the motor (210) when the determination is made, and updates the position count value based on a reference count value stored in association with the predetermined rotational phase.

11 Claims, 10 Drawing Sheets

FIG.6

| S1 | S2 | S3 | ELECTRIC ANGLE COUNT VALUE Ce |
|---|---|---|---|
| L | L | L | ERROR |
| H | L | L | 4 |
| L | H | L | 0 |
| L | L | H | 2 |
| H | H | L | 5 |
| H | L | H | 3 |
| L | H | H | 1 |
| H | H | H | ERROR |

FIG.7

| S4 | S5 | POSITION COUNT VALUE Cp |
|---|---|---|
| H | ↑ | + |
| H | ↓ | − |
| L | ↑ | − |
| L | ↓ | + |
| ↑ | H | − |
| ↓ | H | + |
| ↑ | L | + |
| ↓ | L | − |

CONTROL DEVICE OF ACTUATOR

CROSS-REFERENCE TO RELATED APPLICATIONS

This application is a national phase application of International Application No. PCT/IB2011/001260, filed Jun. 7, 2011, and claims the priority of Japanese Application No. 2010-135326, filed Jun. 14, 2010, the content of both of which is incorporated herein by reference.

BACKGROUND OF THE INVENTION

1. Field of the Invention

The invention relates to a control device of an actuator, and particularly to a control device of an actuator that converts rotary motion of a motor into linear motion of an output shaft and outputs the linear motion.

2. Description of Related Art

A variable valve actuation mechanism that changes valve characteristics of engine valves is described in Japanese Patent Application Publication No. 2008-223705 (JP-A-2008-223705). The variable valve actuation mechanism is driven when a control shaft is displaced in a direction in which its center axis extends, so as to change the operation angle and lift amount of an engine valve according to the amount of displacement of the control shaft. More specifically, the variable valve actuation mechanism increases the operation angle and lift amount when the control shaft is displaced toward one end in the direction of extension of the center axis, and reduces the operation angle and lift amount when the control shaft is displaced toward the other end in the direction of extension of the center axis.

An actuator that converts rotary motion of a motor into linear motion of an output shaft and outputs the linear motion is connected to the control shaft of the variable valve actuation mechanism as described in JP-A-2008-223705. In the internal combustion engine including the variable valve actuation mechanism, the motor of the actuator is controlled so as to displace the control shaft of the variable valve actuation mechanism coupled to the output shaft of the actuator, in the direction of extension of the center axis, thereby to control the operation angle and lift amount of the engine valve.

A control device of the actuator in the internal combustion engine as described above is provided with a position sensor or sensors that generate pulse signals at intervals of a given rotational angle in accordance with rotation of the motor. The control device of the actuator counts the number of pulse signals generated from the position sensor(s), to provide a position count value, and grasps the position of the control shaft based on the position count value. Namely, the amount of displacement of the control shaft coupled to the output shaft of the actuator varies according to the rotational angle of the motor of the actuator; therefore, using this relationship, the control device estimates the amounts of displacement of the control shaft and the output shaft from the reference positions thereof, based on the position count value that increases and decreases in accordance to the rotational angle and rotational direction of the motor. Then, the control device detects the position of the control shaft and the position of the output shaft, based on the thus estimated amounts of displacement of the control shaft and the output shaft from the reference positions.

In the internal combustion engine as described in JP-A-2008-223705, the motor of the actuator is controlled in a feedback fashion so that the thus detected positions of the control shaft and the output shaft are made close to or equal to the positions corresponding to the target operation angle and lift amount, thereby to control the operation angle and lift amount of the engine valve.

In the meantime, when the control device of the actuator is not in operation while the engine is stopped, for example, the control device does not count the position count value. Therefore, if the control shaft of the variable valve actuation mechanism and the output shaft of the actuator are displaced in the direction of extension of the center axis for some reason while the control device of the actuator is not in operation, the displacement is not reflected by the position count value, and the actual position of the control shaft and the actual position of the output shaft do not correspond with the position count value grasped by the control device any longer.

If the actual position of the control shaft and the actual position of the output shaft fail to correspond with the position count value grasped by the control device, the position of the control shaft and the position of the output shaft are controlled based on an erroneous position count value when the internal combustion engine is operated next time, and the operation angle and lift amount cannot be appropriately controlled. As a result, in the worst case, there is a possibility of occurrence of a valve stamp, i.e., contact of the piston that has elevated to the top dead center with the engine valve that is opened.

The above-described problem that the position of the output shaft is controlled based on an erroneous position count value does not only occur to the actuator that drives the variable valve actuation mechanism as described above, but also occurs similarly in a control device of an actuator which counts a position count value based on the rotational angle of a motor, and calculates the position of an output shaft relative to a reference position thereof, based on the position count value.

SUMMARY OF THE INVENTION

The invention provides a control device of an actuator which reduces or eliminates the possibility that the position of an output shaft of the actuator is controlled based on an erroneous position count value, and the position of the output shaft cannot be appropriately controlled.

A first aspect of the invention is concerned with a control device of an actuator used in a condition where reaction force acting on an output shaft thereof increases as the output shaft is displaced toward one end in a direction in which a center axis of the output shaft extends, the actuator being adapted to convert rotary motion of a motor into linear motion of the output shaft and output the linear motion, wherein the control device detects the position of the output shaft by counting a position count value based on a pulse signal generated from a position sensor of the actuator in accordance with rotation of the motor of the actuator. The control device according to the first aspect of the invention includes rotational phase determining means for determining that the motor is in a predetermined rotational phase, number-of-revolutions determining means for determining the number of revolutions that have been made by the motor when the determination is made by the rotational phase determining means, based on a magnitude of current applied to the motor when the determination is made by the rotational phase determining means, storage means for storing a reference count value as a reference value of the position count value, which corresponds to the predetermined rotational phase, and updating means for updating the position count value based on the reference count value, when the determination is made by the rotational phase determining means, for each of the revolutions the number of which is determined by the number-of-revolutions determining means.

With the above arrangement, when it is determined that the motor is in the predetermined rotational phase, the position count value is updated based on the reference count value that is stored in advance and corresponds to the predetermined rotational phase in a condition where there is no discrepancy between the position of the output shaft and the position count value, i.e., the reference count value stored as a value corresponding to a correct position count value.

Therefore, when the position count value grasped by the control device deviates from the value corresponding to the actual position of the output shaft, namely, when the position of the output shaft is controlled based on an erroneous position count value, the position count value is updated based on the reference count value when the motor reaches the predetermined rotational phase. Accordingly, when the motor reaches the predetermined rotational phase, the deviation or difference between the position count value and the actual position of the output shaft is eliminated.

In the case where the motor makes a plurality of revolutions when it controls the position of the output shaft, the rotational phase of the motor comes to the predetermined rotational phase (i.e., the motor reaches the predetermined rotational phase) a plurality of times the number of which is equal to the number of revolutions of the motor. Therefore, when the motor makes a plurality of revolutions when controlling the position of the output shaft, the position of the output shaft cannot be accurately estimated based on the determination that the motor is in the predetermined rotational phase, unless the number of revolutions that have been made by the motor when the determination is made is determined.

On the other hand, the control device according to the above aspect of the invention includes the number-of-revolutions determining means for determining the number of revolutions that have been made by the motor when the determination that the motor is in the predetermined rotational phase is made, based on the magnitude of current applied to the motor when the determination is made.

In the actuator used in a condition where the reaction force acting on the output shaft increases as the output shaft is displaced toward one end in the direction in which the center axis extends, when a given voltage is applied to the motor, to drive the motor so that the position of the output shaft is feedback-controlled to a target position, the value of current applied to the motor increases as the output shaft is displaced toward one end in the direction of extension of the center axis, and the reaction force acting on the output shaft increases.

Therefore, the value of the current applied to the motor increases as the position of the output shaft shifts in the direction in which the reaction force increases, and there is a given relationship between the value of the current applied to the motor and the position of the output shaft, i.e., between the value of the current applied to the motor and the number of revolutions of the motor. Accordingly, by referring to the magnitude of the current applied to the motor when it is determined that the motor is in the predetermined rotational phase, it is possible to estimate the number of revolutions of the motor based on the magnitude of the current. Namely, as the magnitude of the current is larger, the estimated number of revolutions that have been made by the motor in the direction in which the reaction force acting on the output shaft increases is larger.

Accordingly, with the control device including the number-of-revolutions determining means according to the above aspect of the invention, when it is determined that the motor is in the predetermined rotational phase, the number of revolutions that have been made by the motor when the determination is made can be determined, and the position count value can be appropriately updated based on the reference count value corresponding to the number of revolutions of the motor.

In sum, with the control device configured according to above aspect of the invention, when it is determined that the motor is in the predetermined rotational phase, the position count value is accurately updated based on the reference count value corresponding to the correct position count value. Accordingly, it is possible to reduce or eliminate the possibility that the position of the output shaft is controlled based on an erroneous position count value, and the position of the output shaft cannot be appropriately controlled.

In the control device according to the above aspect of the invention, a plurality of determination regions may be set with respect to the magnitude of the current applied to the motor, such that each of the determination regions corresponds to each number of revolutions of the motor, and the number-of-revolutions determining means may determine the number of revolutions that have been made by the motor when the determination is made by the rotational phase determining means, depending on which of the determination regions includes the magnitude of the current applied to the motor when the determination is made by the rotational phase determining means.

The value of the current detected while the actuator is being driven may vary to some extent depending on conditions under which the actuator is used, for example. If, on the other hand, a plurality of determination regions each extending over a given range with respect to the magnitude of the current applied to the motor are set such that one determination region corresponds to each number of revolutions of the motor, as in the control device as described above, the number of revolutions that have been made by the motor when it is determined that the motor is in the predetermined phase can be accurately estimated, by checking which one of the plurality of determination regions includes the magnitude of the current applied to the motor when the above determination is made. Namely, even in the case where there are some degrees of variations in the magnitude of the current detected, the number of revolutions that have been made by the motor when the determination is made by the rotational phase determining means can be accurately estimated, based on the magnitude of the current applied to the motor.

In the control device according to the above aspect of the invention, the rotational phase determining means may include a rotor having a plurality of small magnetic poles comprising N poles and S poles that are alternately arranged to be switched at given angular intervals, and one large magnetic pole that extends over a larger angle than each of the small magnetic poles, wherein N poles and S poles are alternately arranged in the form of a circle, and two position sensors as the above-indicated position sensor, which are mounted at positions that can be opposed to the respective magnetic poles, such that the position sensors are shifted in phase from each other, and the rotational phase determining means may count the position count value based on the pulse signals respectively generated from the two position sensors in accordance with rotation of the motor, and may determine that the rotational phase of the motor is at the predetermined rotational phase, based on change of the pulse signals detected when the large magnetic pole passes the position sensors.

The rotational phase determining means may be specifically constructed such that the arrangement of magnetic poles in a region of the rotor corresponding to the predetermined rotational phase of the motor is made different from the arrangement of magnetic poles in the other regions, as in the control device as described above. With this arrangement, the pattern of changes of the pulse signals generated from the position sensors when the motor is in the predetermined rotational phase differs from that observed when the motor is in another rotational phase, and it can be determined that the rotational phase of the motor is at the predetermined rotational phase, by monitoring changes of the pulse signals.

Accordingly, it is possible to determine whether the rotational phase of the motor is at the predetermined phase, without requiring a new sensor, or the like, for monitoring the rotational phase of the motor, thus avoiding or suppressing an increase in the cost due to provision of the new sensor, and complication of the manufacturing process due to mounting of the sensor.

In the control device according to the above aspect of the invention, the control device may control the actuator for driving, via the output shaft, a control shaft of a variable valve actuation mechanism of an internal combustion engine coupled to the output shaft, in the direction in which the center axis extends, so that an operation angle and a lift amount of an engine valve are changed by the variable valve actuation mechanism.

In the variable valve actuation mechanism of the internal combustion engine which changes the operation angle and lift amount of the engine valve when the control shaft is driven in the direction of extension of the center axis, as the control shaft is driven in such a direction as to increase the operation angle and lift amount of the engine valve, the reaction force due to the bias force of the valve spring increases, and therefore, the reaction force acting on the control shaft increases.

Namely, in the actuator that drives the control shaft of the variable valve actuation mechanism of the internal combustion engine as described above, the reaction force acting on the output shaft increases as the output shaft is displaced toward one end in the direction of extension of the center axis.

Therefore, the control device is specifically used for controlling the actuator which is connected to the variable valve actuation mechanism of the internal combustion engine for changing the operation angle and lift amount of the engine valve when the control shaft is driven in the direction of extension of the center axis, and which drives the control shaft coupled to the output shaft, in the direction of extension of the center axis, as described above.

In the control device as described above, when the internal combustion engine is in given operating conditions, the relationship between the magnitude of current applied to the motor and the reference count value may be re-learned.

The relationship between the magnitude of the current applied to the motor and the reference count value may be changed due to chronological changes of the actuator and the variable valve actuation mechanism, for example. Therefore, when the control device is configured to determine the number of revolutions of the motor, using the relationship between the magnitude of the current applied to the motor and the reference count value, it is desirable to re-learn the relationship between the magnitude of the current and the reference count value, while driving the output shaft in a condition where no variations arise in the position count value.

The reaction force acting on the control shaft of the variable valve actuation mechanism varies according to engine operating conditions. Therefore, when the invention is applied to the control device for controlling the actuator that drives the variable valve actuation mechanism of the internal combustion engine for changing the operation angle and lift amount of the engine valve, it is desirable to re-learn the relationship between the magnitude of the current and the reference count value when the engine is in given operating conditions.

Therefore, the control device according to the above aspect of the invention may be adapted to re-learn the relationship between the magnitude of the current applied to the motor and the stored reference count value corresponding to the predetermined rotational phase, when the engine is in given operating conditions.

If the control device is configured to re-learn the relationship between the magnitude of the current and the reference count value when the engine is in given operating conditions, as described above, learning is executed on the condition that the engine is in substantially the same operating conditions, so that learning can be appropriately carried out without suffering from variations in the relationship between the magnitude of the current and the reference count value due to differences in the engine operating conditions.

The lower the oil temperature of the hydraulic oil supplied to the internal combustion engine is, the higher the viscosity of the hydraulic oil supplied to the actuator and the variable valve actuation mechanism, and further to the valve system of the internal combustion engine, etc., becomes Therefore, as the oil temperature of the hydraulic oil supplied to the internal combustion engine is lower, the resistance that appears when the actuator and the variable valve actuation mechanism are driven becomes larger. Accordingly, the current applied to the motor when it drives the output shaft to the position corresponding to the reference count value increases as the oil temperature of the hydraulic oil supplied to the internal combustion engine is lower.

In the control device as described above, therefore, the temperature of hydraulic oil supplied to the internal combustion engine may be monitored as a parameter used when determining whether the internal combustion engine is in the given operating conditions set for learning the relationship between the magnitude of the current and the reference count value.

With the above arrangement, learning is executed on the condition that at least the temperature of the hydraulic oil is in a substantially equal condition, so that learning can be appropriately carried out without suffering from variations in the relationship between the magnitude of the current and the reference count value due to differences in the temperature of the hydraulic oil.

As the engine speed is higher, and the frequency (the number of times) of opening of the engine valve per unit time is higher, the reaction force acting on the control shaft of the variable valve actuation mechanism and the output shaft of the actuator under the bias force of a valve spring increases. Therefore, as the engine speed is higher, the reaction force acting on the output shaft of the actuator increases, and the current applied to the motor when the output shaft is driven to the position corresponding to the reference count value increases.

Therefore, the control device as described above may be arranged to monitor the engine speed as a parameter used when determining whether the internal combustion engine is in the given operating conditions set for learning the relationship between the magnitude of the current and the reference count value.

With the above arrangement, learning is executed on the condition that at least the engine speed is in a substantially equal condition, so that learning can be appropriately carried out without suffering from variations in the relationship between the magnitude of the current and the reference count value due to differences in the engine speed.

When the displacement speeds of the output shaft of the actuator and the control shaft of the variable valve actuation mechanism are high, the output shaft and the control shaft are driven at high speeds against the inertial force. Therefore, as the displacement speed is higher, electric power consumed for driving the output shaft increases, and the current applied to the motor when the output shaft is driven to the position corresponding to the reference count value increases.

Therefore, the control device as described above may be arranged to monitor at least the displacement speeds of the output shaft and the control shaft as a parameter used when determining whether the internal combustion engine is in the given operating conditions set for learning the relationship between the magnitude of the current and the reference count value.

With the above arrangement, learning is executed on the condition that at least the displacement speeds of the output shaft and the control shaft are in substantially equal conditions, so that learning can be appropriately carried out without suffering from variations in the relationship between the magnitude of the current and the reference count value due to differences in the displacement speeds of the output shaft and the control shaft.

In this connection, since the output shaft and the control shaft are coupled integrally to each other, and are displaced by the same amount at the same time, there is no need to monitor the displacement speeds of both of the output shaft and the control shaft, but the displacement speeds of the output shaft and the control shaft can be monitored by monitoring the displacement speed of only one of the output shaft and the control shaft.

As a specific manner of updating the position count value based on the reference count value when it is determined that the motor is in the predetermined rotational phase, each time the rotational phase determining means determines that the motor is in the predetermined rotational phase, the updating means may update the position count value based on the reference count value, so that the position count value becomes equal to the reference count value corresponding to the predetermined rotational phase.

Also, in the control device according to the above aspect of the invention, each time the rotational phase determining means determines that the motor is in the predetermined rotational phase, the updating means may compare the position count value grasped by the control device with the reference count value, so as to determine a deviation of the position count value from the reference count value, and may update the position count value based on the reference count value when the deviation is large, so that the position count value becomes equal to the reference count value corresponding to the predetermined rotational phase.

A second aspect of the invention is concerned with a method of controlling an actuator used in a condition where reaction force acting on an output shaft thereof increases as the output shaft is displaced toward one end in a direction in which a center axis of the output shaft extends, the actuator being adapted to convert rotary motion of a motor into linear motion of the output shaft and output the linear motion. The method includes the steps of: detecting a position of the output shaft by counting a position count value based on a pulse signal generated from a position sensor of the actuator in accordance with rotation of the motor of the actuator, determining that the motor is in a predetermined rotational phase, determining the number of revolutions that have been made by the motor when it is determined that the motor is in the predetermined rotational phase, based on a magnitude of current applied to the motor when it is determined that the motor is in the predetermined rotational phase, storing a reference count value as a reference value of the position count value, which corresponds to the predetermined rotational phase, and updating the position count value based on the reference count value when it is determined that the motor is in the predetermined rotational phase, for each of the revolutions the number of which is determined when it is determined that the motor is in the predetermined phase.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a table indicating the relationship between pulse signals generated from the electric angle sensors and an electric angle counter value, for use in one embodiment of the invention;

FIG. 7 is a table indicating the relationship between pulse signals generated from the position sensors and a position count value, for use in one embodiment of the invention;

DETAILED DESCRIPTION OF EMBODIMENTS

Referring to FIG. 1 through FIG. 9, a control device of an actuator according to one embodiment of the invention will be described. In this embodiment, the control device is in the form of an electronic control unit that controls an actuator for driving a variable valve actuation mechanism of an internal combustion engine.

Figure 1:
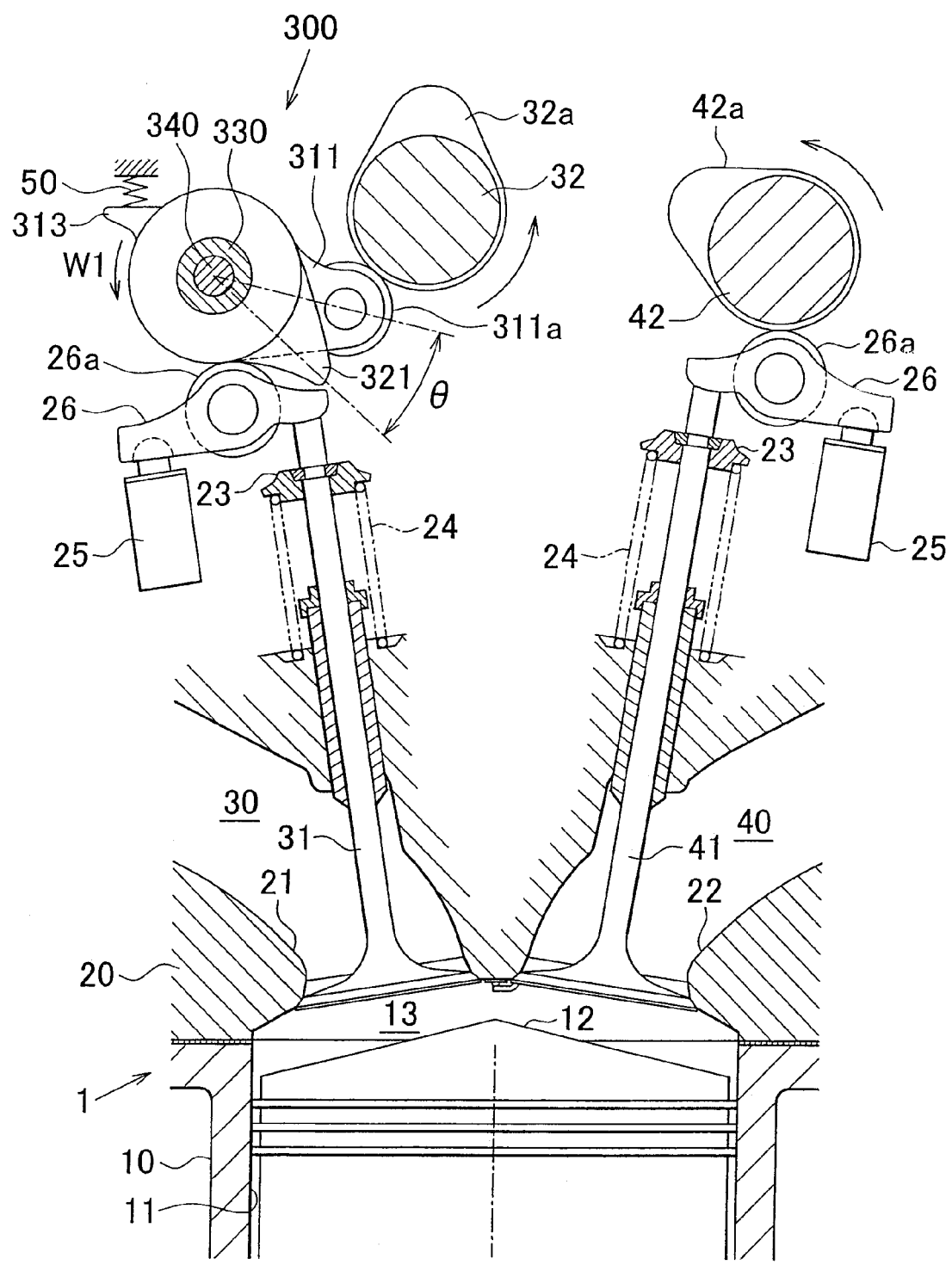
FIG. 1 is a cross-sectional view of an internal combustion engine in which a variable valve actuation mechanism that is driven by an actuator according to one embodiment of the invention is installed.

FIG. 1 is a cross-sectional view of an internal combustion engine in which a variable valve actuation mechanism 300 driven by an actuator 200 according to one embodiment of the invention is installed. As shown in FIG. 1, an engine body 1 of the internal combustion engine in which the variable valve actuation mechanism 300 is installed is formed by assembling a cylinder block 10 with a cylinder head 20.

A piston 12 is slidably received in a cylinder 11 formed in the cylinder block 10. The cylinder head 20 is mounted on the top of the cylinder block 10, and a combustion chamber 13 is defined by the inner circumferential surface of the cylinder 11, the top face of the piston 12, and the lower surface of the cylinder head 20.

An intake port 21 and an exhaust port 22, which communicate with the combustion chamber 13, are formed in the cylinder head 20. The intake port 21 is connected to an intake manifold (not shown), and forms a part of an intake passage 30. The exhaust port 22 is connected to an exhaust manifold (not shown), and forms a part of an exhaust passage 40.

As shown in FIG. 1, an intake valve 31 that permits and inhibits communication between the intake passage 30 and the combustion chamber 13 and an exhaust valve 41 that permits and inhibits communication between the exhaust passage 40 and the combustion chamber 13 are provided in the cylinder head 20. A retainer 23 is fixed to each of the valves 31, 41, and a valve spring 24, which is in a compressed state, is provided between the cylinder head 20 and the retainer 23. With this arrangement, each of the valves 31, 41 is biased in a valve closing direction, i.e., in a direction to close the valve, under bias force of the corresponding valve spring 24.

A lash adjuster 25 corresponding to each of the valves 31, 41 is provided inside the cylinder head 20, and a rocker arm 26 is provided to extend between the lash adjuster 25 and the corresponding valve 31, 41. As shown in FIG. 1, the rocker arm 26 is supported at one end by the lash adjuster 25 located below the arm, and the other end of the rocker arm 26 abuts on a distal end portion of the corresponding valve 31, 41.

Furthermore, intake camshaft 32 and exhaust camshaft 42 that drive the intake valve 31 and the exhaust valve 41, respectively, in valve opening directions are rotatably supported on the cylinder head 20. As shown in the upper section of FIG. 1, an intake cam 32a is formed on the intake camshaft 32, and an exhaust cam 42a is formed on the exhaust camshaft 42.

As shown in the upper right-hand section of FIG. 1, the outer circumferential surface of the exhaust cam 42a abuts on a roller 26a of the rocker arm 26 abutting on the exhaust valve 41. With this arrangement, if the exhaust camshaft 42 rotates during engine operation, as indicated by an arrow located to the upper right of the exhaust camshaft 42 in FIG. 1, the rocker arm 26 oscillates or rocks about a portion at which the rocker arm 26 is supported by the lash adjuster 25, under the action of the exhaust cam 42a. As a result, the exhaust valve 41 is lifted by the rocker arm 26 in the valve opening direction.

On the other hand, as shown in the upper left-hand section of FIG. 1, the variable valve actuation mechanism 300 is disposed between the intake cam 32a, and the rocker arm 26 that abuts on the intake valve 31. The variable valve actuation mechanism 300 has input arms 311 and output arms 321 (see FIG. 2), and the input arms 311 and output arms 321 are supported such that they can oscillate or rock about a support pipe 330 fixed to the cylinder head 20.

The rocker arm 26 is biased from below toward the output arms 321, under the bias force of the valve spring 24, and a roller 26a provided in a middle portion of the rocker arm 26 abuts on the undersides of the outer circumferential surfaces of the output arms 321.

Also, a projection 313 is provided on the outer circumferential surface of the variable valve actuation mechanism 300, and the projection 313 is biased as indicated by an arrow W1 in the left-hand section of FIG. 1, under the bias force of a spring 50 fixed in the cylinder head 20. With this arrangement, the variable valve actuation mechanism 300 is biased in the counterclockwise direction as indicated by the arrow W1 about the support pipe 330, so that a roller 311a provided at the distal ends of the input arms 311 abuts on the outer circumferential surface of the intake cam 32a.

Accordingly, if the intake cam 32a rotates during engine operation, as indicated by an arrow located to the lower right of the intake camshaft 32 in FIG. 1, the variable valve actuation mechanism 300 oscillates about the support pipe 330, under the action of the intake cam 32a. As a result, the rocker arm 26 oscillates or rocks about a portion at which the arm 26 is supported by the lash adjuster 25, under the action of the output arms 321, and the intake valve 31 is lifted by the rocker arm 26 in the valve opening direction.

A control shaft 340 is inserted in the support pipe 330 of the variable valve actuation mechanism 300, such that the control shaft 340 is movable in a direction in which the center axis of the shaft 340 extends. In the variable valve actuation mechanism 300, a phase difference between the input arms 311 and the output arms 321 with respect to the support pipe 330, or angle θ formed by the input arms 311 and the output arms 321 as indicated in FIG. 1, can be changed by displacing or moving the control shaft 340 in the direction of extension of the center axis.

Figure 2:
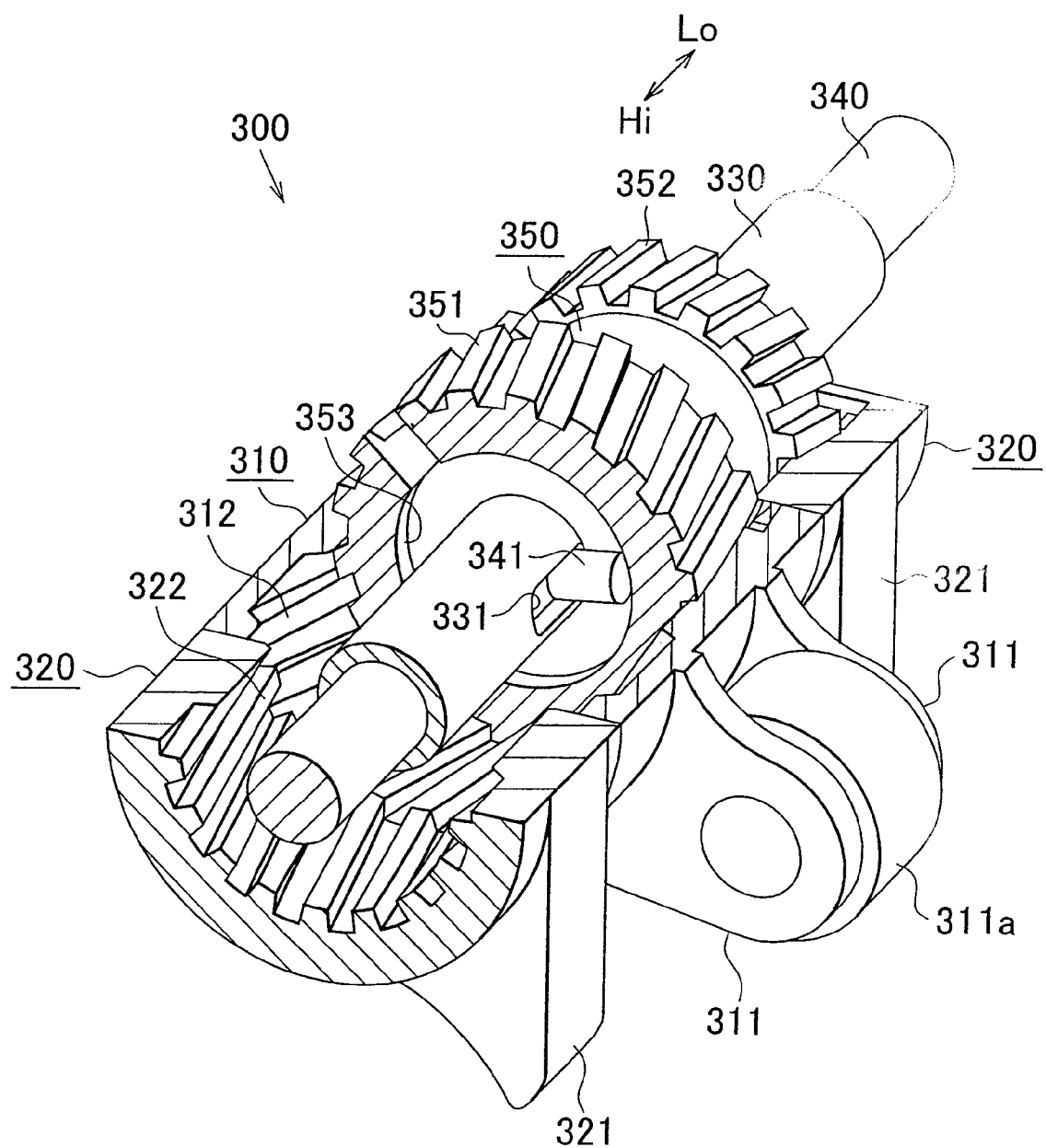
FIG. 2 is a broken-out perspective view showing the internal structure of the variable valve actuation mechanism according to one embodiment of the invention.

Referring next to FIG. 2, the construction of the variable valve actuation mechanism 300 will be described in detail. FIG. 2 is a broken-out perspective view showing the internal structure of the variable valve actuation mechanism 300 according to this embodiment of the invention. As shown in FIG. 2, the control shaft 340 is inserted in the support pipe 330 fixed to the cylinder head 20, such that the control shaft 340 is movable in the extension direction of the center axis of the support pipe 330. Also, a cylindrical slider 350 is fitted on the support pipe 330 such that the slider 350 is movable in the extension direction of the center axis of the support pipe 330.

A groove 353 is formed in the inner wall of the cylindrical slider 350 so as to extend in the circumferential direction of the slider 350. An engaging pin 341 whose distal end portion is inserted in a recess (not shown) formed in the control shaft 340 is received in the groove 353. Also, a slot 331 that extends in the extension direction of the center axis of the support pipe 330 is formed through the wall thickness of the support pipe 330, and the engaging pin 341 extends through the slot 331 to be engaged with the groove 353 of the slider 350. With this arrangement, the slider 350 freely rotates about the support pipe 330 and the control shaft 340, and moves in accordance with the displacement of the control shaft 340 in the extension direction of the center axis thereof.

Also, a helical spline gear 351 is formed on a middle portion of the outer circumferential surface of the slider 350, and helical spline gears 352 whose tooth trace is inclined in the direction opposite to that of the helical spline gear 351 are formed on opposite end portions of the outer circumferential surface of the slider 350. It is to be noted that only the right-hand portion of the slider 350 is illustrated in FIG. 2, for the sake of simplicity of explanation.

As shown in FIG. 2, an input portion 310, and a pair of output portions 320 between which the input portion 310 is sandwiched, are fitted on the slider 350. A helical spline gear 312 is formed on the inner circumferential surface of the input portion 310, and the helical spline gear 312 meshes with the helical spline gear 351 of the slider 350. Also, a pair of input arms 311 that protrude in a radial direction are formed on the outer circumferential surface of the input portion 310, and a roller 311a is rotatably supported between the pair of input arms 311.

On the other hand, helical spline gears 322 are formed on the inner circumferential surfaces of the pair of output portions 320, and the helical spline gears 322 mesh with the respective helical spline gears 352 of the slider 350. Also, output arms 321 that protrude in a radial direction are formed on the outer circumferential surfaces of the respective output portions 320.

With the variable valve actuation mechanism 300 formed as described above, when the control shaft 340 is displaced in the direction in which its central axis extends, the slider 350 is displaced in the direction of extension of the central axis in accordance with the displacement of the control shaft 340. The tooth traces of the helical spline gears 351, 352 formed on the outer circumferential surface of the slider 350 extend in different directions, and the helical spline gears 351, 352 mesh with the helical spline gears 312, 322, respectively, formed on the internal circumferential surfaces of the input portion 310 and the output portions 320. Therefore, if the slider 350 is displaced in the extension direction of its central axis, the input portion 310 and the output portions 320 rotate in the opposite directions. As a result, the phase difference between the input arms 311 and the output arms 321 is changed, and the operation angle and lift amount of the intake valve 31 are changed.

More specifically, if the control shaft 340 is displaced in the direction of arrow Hi indicated in FIG. 2, the slider 350 moves in the Hi direction along with the control shaft 340. With the slider 350 thus moved, the phase difference between the input arms 311 and the output arms 321, i.e., the angle θ indicated in FIG. 1, increases, and the operation angle and lift amount of the intake valve 31 are increased. On the other hand, if the control shaft 340 is displaced in the direction of arrow Lo indicated in FIG. 2, the slider 350 moves in the Lo direction along with the control shaft 340; as a result, the phase difference between the input arms 311 and the output arms 321 is reduced, and the operation angle and lift amount of the intake valve 31 are reduced.

In the internal combustion engine according to this embodiment, the control shaft 340 is displaced in the direction of extension of the center axis during engine operation, so that the operation angle and lift amount of the intake valve 31 are changed through the variable valve actuation mechanism 300.

Figure 3:
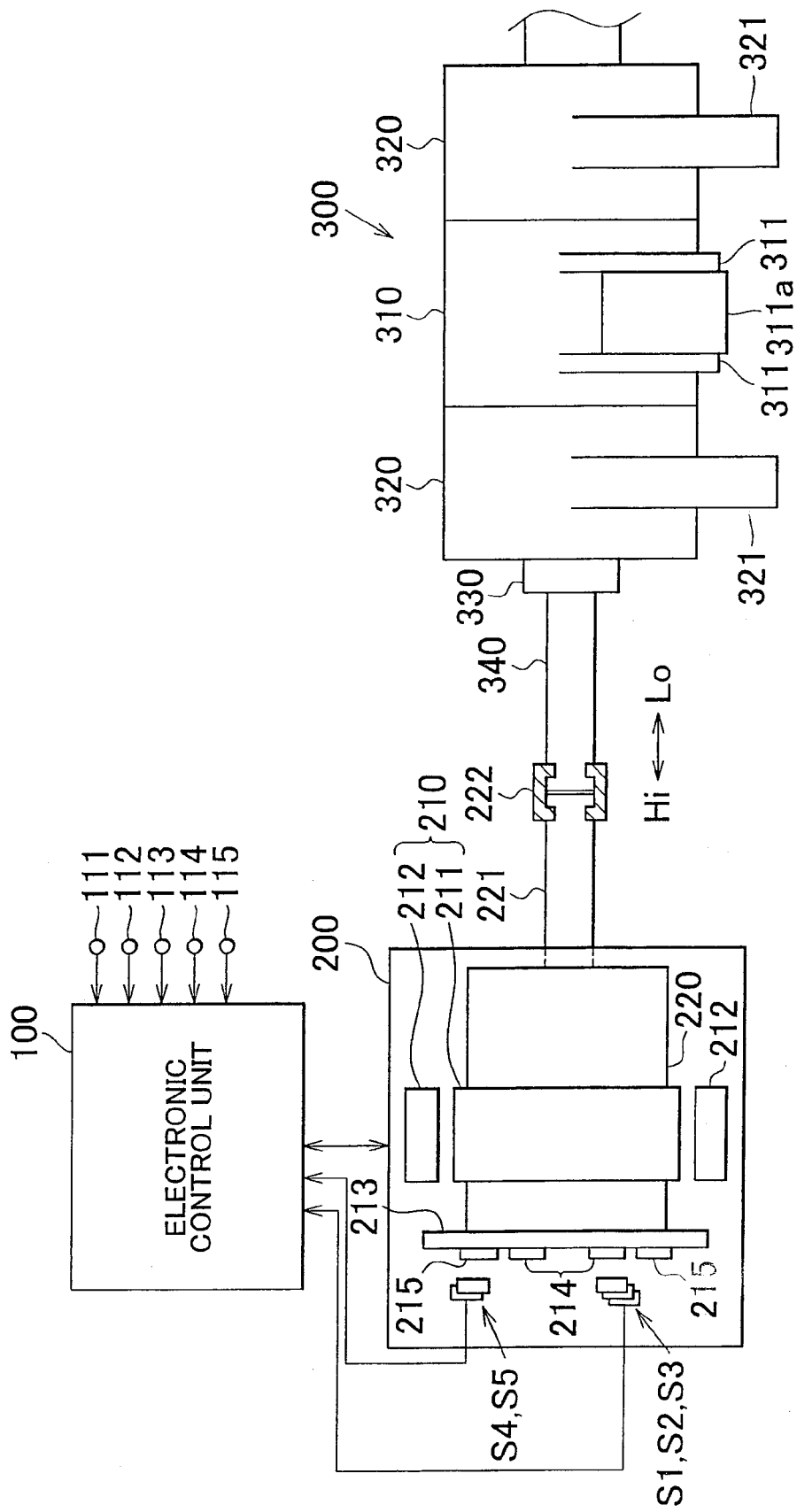
FIG. 3 is a schematic view showing the construction of the actuator according to one embodiment of the invention, and the relationship among the actuator, an electronic control unit that controls the actuator, and the variable valve actuation mechanism driven by the actuator.

Next, the construction of the actuator 200 that displaces or moves the control shaft 340 in the direction of extension of the center axis will be described with reference to FIG. 3 and FIG. 4. FIG. 3 is a schematic view showing the construction of the actuator 200 according to this embodiment, an electronic control unit 100 that controls the actuator 200, the variable valve actuation mechanism 300 driven by the actuator 200, and the relationship among the actuator 200, the electronic control unit 100, and the variable valve actuation mechanism 300.

As shown in FIG. 3, the actuator 200 includes a motor 210 that principally consists of a magnet 211 and a stator 212, and a motion conversion mechanism 220 that converts rotary motion of the motor 210 into linear motion of an output shaft 221 of the actuator 200. The control shaft 340 of the variable valve actuation mechanism 300 is coupled at its distal end to the output shaft 221 of the actuator 200 with a brace or retainer 222.

With the above arrangement, when the motor 210 is rotated within a predetermined range, e.g., within a rotational angle range (0–3600°) corresponding to 10 revolutions, for example, the rotary motion of the motor 210 is converted into linear motion via the motion conversion mechanism 220, and then transmitted to the control shaft 340 via the output shaft 221. As a result, the control shaft 340 is displaced in the direction of extension of the center axis, along with the output shaft 221, so as to drive the variable valve actuation mechanism 300.

If the motor 210 is rotated in the positive direction, the control shaft 340 is displaced in the direction of arrow Hi indicated in FIG. 3, and the phase difference between the input arms 311 and the output arms 321 of the variable valve actuation mechanism 300 increases, so that the operation angle and lift amount of the intake valve 31 are increased, as described above. On the other hand, if the motor 210 is rotated in the reverse direction, the control shaft 340 is displaced in the direction of arrow Lo indicated in FIG. 3, and the phase difference between the input arms 311 and the output arms 321 is reduced, so that the operation angle and lift amount of the intake valve 31 are reduced.

The displacement of the control shaft 340 in the direction of arrow Hi and the displacement thereof in the direction of arrow Lo are limited to within the range corresponding to 10 revolutions of the motor 210, by means of a stopper (not shown) provided on the control shaft 340, and the position at which the stopper abuts on a part of the cylinder head 20 defines a movable limit position of the control shaft 340.

In the internal combustion engine according to this embodiment, the operation angle and lift amount of the intake valve 31 can be changed by driving the actuator 200 so as to displace or move the control shaft 340 coupled to the output shaft 221 in the direction of extension of its center axis.

As shown in the left-hand section of FIG. 3, the motor 210 that drives the actuator 200 includes a magnet 211 fixed to the outer circumferential surface of the motion conversion mechanism 220, and a stator 212 that is energized based on a drive command from the electronic control unit 100.

A disc-shaped rotor 213 is fixed to the rear end of the motion conversion mechanism 220. As shown in FIG. 4, the rotor 213 has a multipole (8-pole) magnet 214 having four N poles and four S poles that are alternately arranged at intervals of equal angle to form a circle, and a multipole (46-pole) magnet 215 having 23 N poles and 23 S poles that are alternately arranged to form a circle having the same center as that of the 8-pole magnet 214. Namely, the 8-pole magnet 214 and the 46-pole magnet 215 are fixed concentrically with each other.

Figure 4:
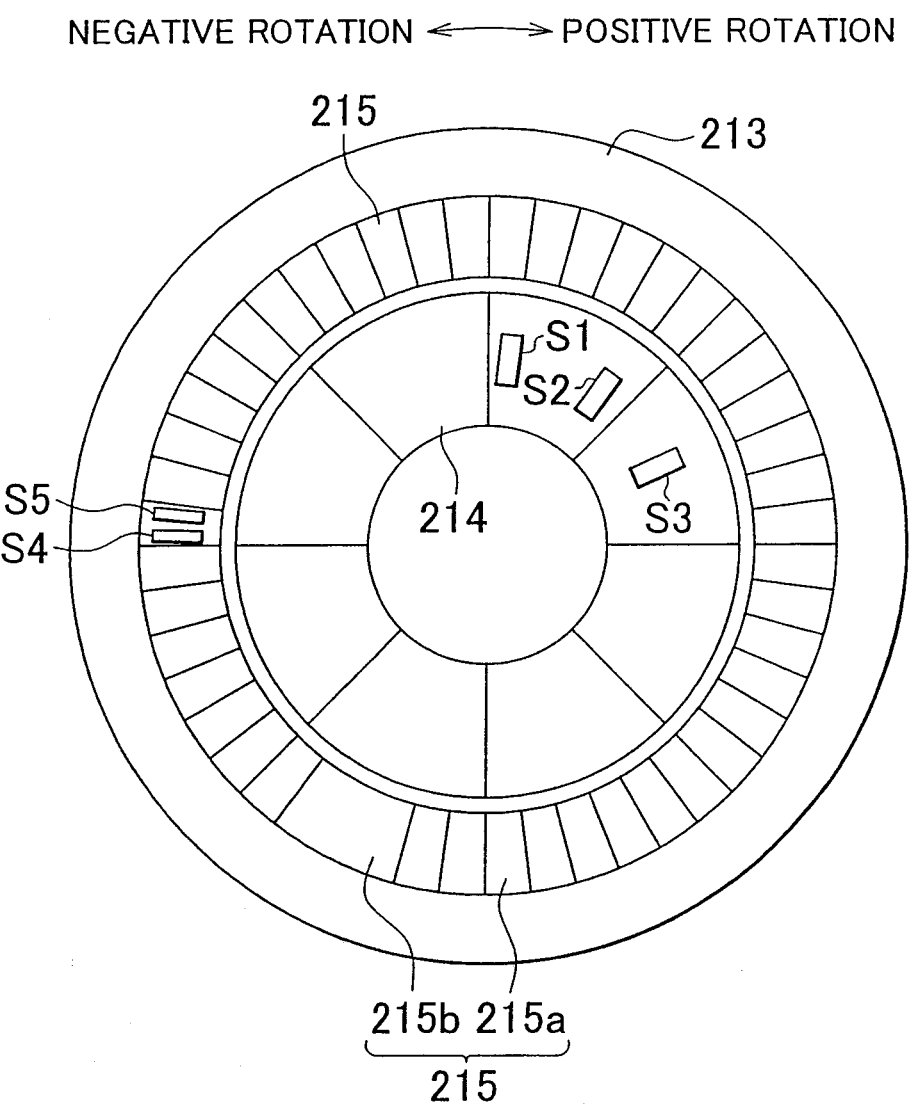
FIG. 4 is a schematic view showing the mounting pattern of electric angle sensors and position sensors of the actuator according to one embodiment of the invention.

As shown in FIG. 4, the magnetic poles of the multipole (8-pole) magnet 214 are placed evenly or equally over the entire circumference thereof such that the N poles and the S poles are alternately arranged to be switched at intervals of 45°. On the other hand, the multipole (46-pole) magnet 215 has 45 small magnetic poles 215a of which N poles and S poles are alternately arranged to be switched at intervals of 7.5°, and one large magnetic pole 215b whose size is equivalent to that of three small magnetic poles 215a, and the N poles and S poles of the multipole (46-pole) magnet 215 are alternately arranged, as shown in FIG. 4. Therefore, the N poles and S poles are switched at intervals of 7.5° in a portion where the small magnetic poles 215a are alternately placed, and the S pole extends over an angle of 22.5° in a portion where the large magnetic pole 215b is placed.

As shown in FIG. 3 and FIG. 4, electric angle sensors S1, S2, S3 are disposed at angular or phase intervals of 30°, in a region of the actuator 200 which is opposed to the multipole magnet 214. Meanwhile, position sensors S4, S5 are disposed at an angular or phase interval of 3.75° in a region of the actuator 200 which is opposed to the multipole magnet 215.

With the above arrangement, when the rotor 213 rotates in accordance with rotation of the motor 210, each of the sensors S1-S5 alternately faces the N poles and S poles of the corresponding multipole magnet, and successively and alternately generates a high signal "H" corresponding to the N pole and a low signal "L" corresponding to the S pole.

As shown in FIG. 3, the electric angle sensors S1, S2, S3 and the position sensors S4, S5 are connected to the electronic control unit 100 that comprehensively controls the internal combustion engine, and the electronic control unit 100 receives pulse signals generated from the electric angle sensors S1, S2, S3 and the position sensors S4, S5. Then, the electronic control unit 100 controls the motor 210 of the actuator 200 based on the pulse signals, and also controls respective parts of the internal combustion engine.

The electronic control unit 100 includes a central processing unit (CPU), and various memories, such as a read-only memory (ROM), a random access memory (RAM), and EEPROM as a non-volatile memory capable of rewriting stored data.

To the electronic control unit 100 are also connected an accelerator position sensor 111 that detects the amount ACCP of operation of the accelerator pedal by the driver, an air flow meter 112 that detects the amount GA of intake air drawn into the combustion chamber 13 through the intake passage 30, and a crank position sensor 113 that detects the engine speed NE, in addition to the above-indicated sensors S1-S5. Also, a cam position sensor 114 that detects the rotational phase of the intake camshaft 32, a water temperature sensor 115 that detects the engine coolant temperature THW, and other sensors or devices are connected to the electronic control unit 100.

The electronic control unit 100 receives output signals from these various sensors 111-115, performs computations related to control of the fuel injection amount and the ignition timing, based on the received output signals, and executes drive control of the variable valve actuation mechanism 300, i.e., drive control of the actuator 200, so that the operation angle and lift amount of the intake valve 31 become suitable or appropriate for engine operating conditions.

Figure 5:
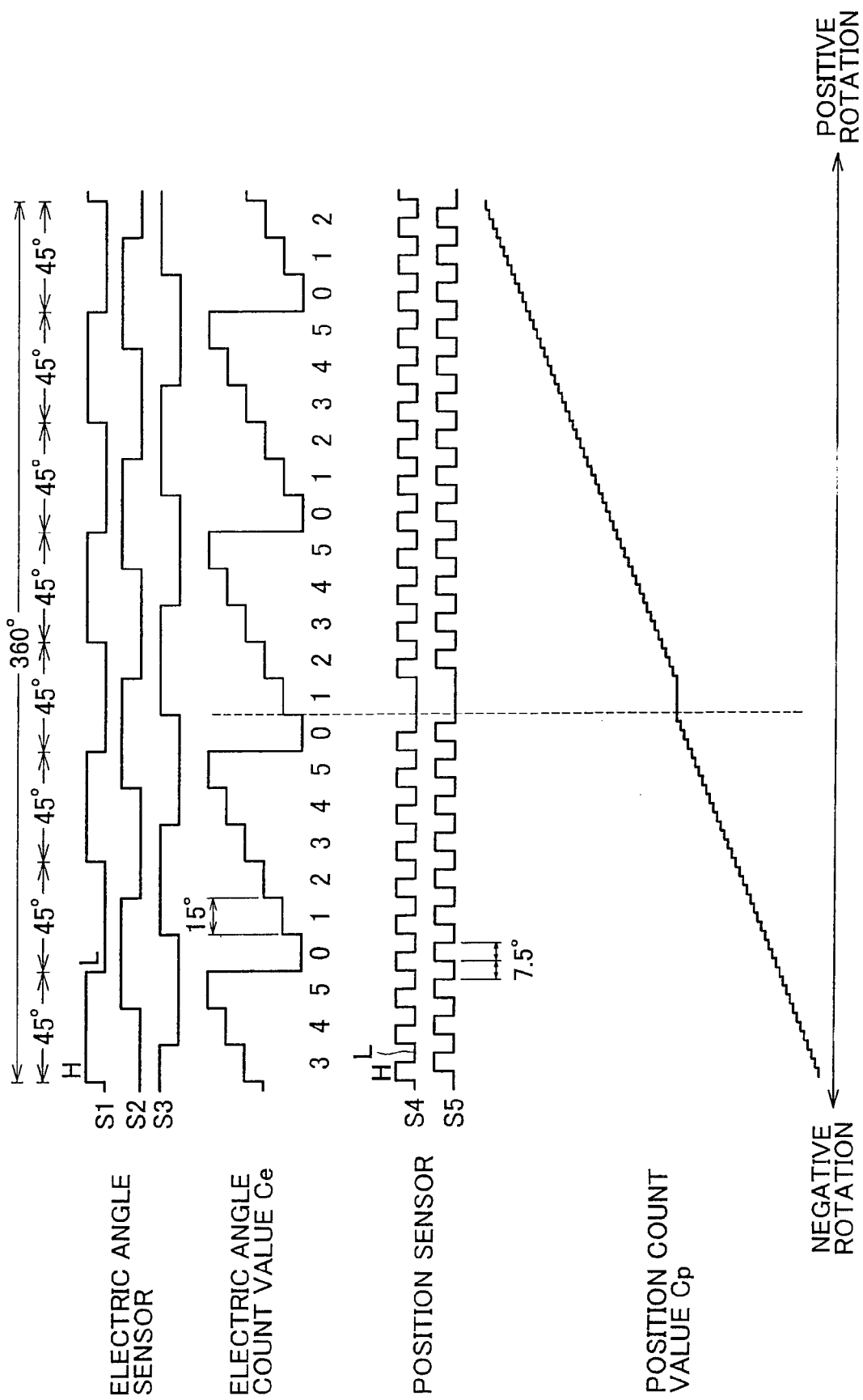
FIG. 5 is an explanatory view showing the patterns of changes of electric angle count values and position count values counted by the electronic control unit according to one embodiment of the invention.

In the following, the driving control of the actuator 200 will be described with reference to FIG. 5-FIG. 7. As described above, the electric angle sensors S1, S2, S3 are disposed at angular intervals (or phase differences) of 30°. Therefore, as the motor 210 rotates, pulse signals, each comprising high signals "H" and low signals "L" alternately switched as indicated in the top section of FIG. 5, are generated from the respective electric angle sensors S1, S2, S3, such that the pulse signals are shifted in phase from each other by an amount corresponding to the rotational angle of 30°.

The electronic control unit 100 calculates an electric angle count value Ce based on a pattern of the pulse signals from the respective electric angle sensors 51, S2, S3. More specifically, the electronic control unit 100 sets the electric angle count value Ce to one of "0", "1", "2", "3", "4" and "5", based on which of the high signal "H" and low signal "L" is generated from each of the electric angle sensors S1, S2, S3, as shown in FIG. 6.

The table of FIG. 6 is set so that the electric angle count value Ce changes in a forward direction in the order of "0"→"1"→"2"→"3"→"4"→"5"→"0" when the motor 210 is rotated in the positive direction, whereas the electric angle count value Ce changes in a backward direction in the order of "5"→"4"→"3"→"2"→"1"→"0"→"5" when the motor 210 is rotated in the reverse direction. Thus, the electric angle count value Ce changes each time the rotational angle of the motor 210 changes by 15°, as shown in FIG. 5, and the value of the electric angle count value Ce changes in steps in accordance with rotation of the motor 210.

The values "0", "1", "2", "3", "4", "5" of the electric angle count value Ce correspond to an energization pattern, i.e., a pattern of current application to respective phases of the motor 210. Namely, in this embodiment, the rotor 213 having eight magnetic poles placed in the shape of a circle such that the N poles and the S poles are arranged alternately, and the three electric angle sensors S1, S2, S3 constitute an 8-pole 3-phase electric angle counter. Thus, the electronic control unit 100 controls the motor 210 by switching the energized phase of the motor 210 based on the electric angle count value Ce counted by the electric angle counter.

Since there is no possibility for all of the three electric angle sensors S1, S2, S3 to generate low signals "L" or high signals "H" at the same time, in view of the arrangement of the electric angle counter, the electronic control unit 100 determines that an abnormality occurs in the electric angle counter when all of the three electric angle sensors S1, S2, S3 generate low signals "L" or high signals "H" at the same time, as shown in FIG. 6.

In the meantime, the position sensors S4, S5 are disposed at an angular interval (or phase difference) of 3.75°, as described above. Therefore, as the motor 210 rotates, pulse signals, each comprising high signals "H" and low signals "L" alternately switched as indicated in the middle section of FIG. 5, are generated from the respective position sensors S4, S5, such that the pulse signals are shifted in phase from each other by an amount corresponding to the rotational angle of 3.75°.

The electronic control unit 100 counts a position count value Cp based on the output pattern of the pulse signals from the respective position sensors S4, S5. More specifically, the electronic control unit 100 counts the position count value Cp, by adding "+1" or "−1" to the position count value Cp, depending on whether the output signal of one of the position sensors S4, S5 is a rise edge "↑" or a fall edge "↓", or the output signal of the other position sensor is a high signal "H" or a low signal "L", as shown in FIG. 7.

The position count value Cp counted based on the pulse signals of the position sensors S4, S5 in the above manner increases in accordance with driving of the motor 210 when the motor 210 is rotated in the positive direction, and decreases in accordance with driving of the motor 210 when the motor 210 is rotated in the reverse direction, as indicated in the lower section of FIG. 5. Therefore, the electronic control unit 100 detects the amount of displacement of the output shaft 221 from the reference position, based on the value of the position count value Cp, and grasps the positions of the output shaft 221 and the control shaft 340.

Namely, the amount of displacement of the control shaft 340 coupled to the output shaft 221 of the actuator 200 changes in accordance with the rotational angle of the motor 210 of the actuator 200; therefore, the amounts of displacement of the control shaft 340 and the output shaft 221 from the reference positions are estimated using this relationship, based on the position count value Cp that increases or decreases in accordance with the rotational angle and rotational direction of the motor 210.

Then, the position of the control shaft 340 and the position of the output shaft 221 are detected, based on the thus estimated amounts of displacement of the control shaft 340 and the output shaft 221 from the reference positions. The electronic control unit 100 controls the operation angle and lift amount of the intake valve 31, by controlling the motor 210 of the actuator 200 in a feedback manner so that the thus detected position of the control shaft 340 becomes closer to or coincides with a position corresponding to the target operation angle and lift amount.

When no current is applied to the electronic control unit 100, such as when the engine is stopped or at rest, and the electronic control unit 100 is not in operation, the electronic control unit 100 does not count the position count value Cp. Therefore, if the control shaft 340 of the variable valve actuation mechanism 300 is displaced in the direction of extension of the center axis for some reason while the electronic control unit 100 is not in operation, the displacement is not reflected by the position count value Cp, and the actual position of the control shaft 340 no longer corresponds with the position count value Cp grasped by the electronic control unit 100.

In this connection, the bias force of the valve spring 24 for biasing the intake valve 31 in the valve closing direction acts on the control shaft 340 of the variable valve actuation mechanism 300 all the time. Therefore, when the temperature of the lubricating oil is high, and the friction is reduced in the variable valve actuation mechanism 300, or when the engine is kept stopped for a long period of time, for example, the control shaft 340 may be driven in such a direction (Lo direction) as to reduce the operation angle and lift amount, due to the bias force of the valve spring 24, and the control shaft 340 may be displaced while the engine is stopped as described above.

If the actual position of the control shaft 340 does not correspond with (i.e., is not accurately represented by) the position count value Cp grasped by the electronic control unit 100, the position of the control shaft 340 is controlled based on the erroneous position count value Cp when the internal combustion engine is operated next time, and the electronic control unit 100 fails to appropriately control the operation angle and lift amount of the intake valve 31. As a result, in the worst case, there is a possibility of occurrence of a valve stamp, i.e., contact of the piston 12 that has been elevated to the vicinity of the top dead center with the intake valve 31 that is opened.

In the internal combustion engine according to this embodiment, therefore, when the motor 210 of the actuator 200 reaches a predetermined rotational phase during engine operation, the position count value Cp is updated to a reference count value Cp(N) stored in advance as a position count value Cp corresponding to the rotational phase.

In the actuator 200 of this embodiment, the multipole magnet 215 is not foamed by magnetic poles that are equally arranged over the entire circumference thereof, but includes the large magnetic pole 215b that is larger in size than the small magnetic poles 215a as described above, so that it can be determined that the motor 210 is in the predetermined rotational phase, based on the pulse signals generated from the position sensors S4, S5. With this arrangement, when the large magnetic pole 215b passes the position sensors S4, S5 as indicated in the middle section of FIG. 5, the pulse signals generated from the position sensors S4, S5 change in different manners from those generated when the motor 210 is in another rotational phase.

In this embodiment, the predetermined rotational phase in which the pulse signals generated from the position sensors S4, S5 change in different manners from those generated when the motor 210 is in another rotational phase, namely, the rotational phase of the motor 210 when the large magnetic pole 215b passes the position sensors S4, S5, is referred to as "reference phase".

When it is determined that the rotational phase of the motor 210 is at the reference phase, a reference count value Cp(N) stored in advance when there is no discrepancy between the position of the output shaft 221 and the position count value Cp is read as the correct value of the position count value Cp corresponding to the reference phase. Then, the position count value Cp is updated based on the reference count value Cp(N).

For control of the variable valve actuation mechanism 300, the actuator 200 of this embodiment is controlled within the range corresponding to 10 revolutions of the motor 210. Therefore, as the variable valve actuation mechanism 300 is controlled, an operating condition in which the motor 210 is in the reference rotational phase occurs 10 times at a maximum, namely, the operating condition occurs the number of times corresponding to the number of revolutions of the motor 210. Therefore, when it is determined that the motor 210 is in the reference phase, the position of the output shaft 221 cannot be accurately estimated based on the determination, unless the number of revolutions that have been made by the motor 210 at the time when the determination is made is determined.

In this embodiment, therefore, when it is determined that the motor 210 is in the reference phase, the number of revolutions of the motor 210 counted from the Lo-direction movable limit position when the above determination is made is determined, based on the magnitude of current applied to the motor 210 when it is determined that the motor 210 is in the reference phase.

Since the bias force of the valve spring 24 for biasing the intake valve 31 in the valve closing direction acts on the control shaft 340 of the variable valve actuation mechanism 300 all the time, as described above, the reaction force acting on the output shaft 221 increases as the output shaft 221 is displaced in the Hi direction, in the actuator 200 of this embodiment. Therefore, when the motor 210 is driven so that the position of the output shaft 221 is feedback-controlled to the target position, the value of the current applied to the motor 210 increases as the output shaft 221 is displaced in the Hi direction and the reaction force acting on the output shaft 221 increases.

Namely, the value of the current applied to the motor 210 increases as the position of the output shaft 221 shifts in the Hi direction, and there is a given relationship between the value of the current applied to the motor 210 and the position of the output shaft 221, i.e., between the value of the current applied to the motor 210 and the number of revolutions of the motor 210.

Accordingly, with reference to the magnitude of the current applied to the motor 210 when it is determined that the motor 210 is in the predetermined rotational phase, the number of revolutions of the motor 210 can be estimated based on the magnitude of the current. In sum, it can be presumed that the number of revolutions made by the motor 210 to move the output shaft 221 in the Hi direction is larger as the current is larger.

Thus, the electronic control unit 100 of this embodiment refers to the magnitude of the current applied to the motor 210 when it is determined that the motor 210 is in the reference phase, and determines the number of revolutions that have been made by the motor 210 from the Lo-direction movable limit position at the time when the above determination is made, based on the above-indicated magnitude of the current.

The above-indicated reference count value Cp(N) is set for each number of revolutions of the motor 210 from the Lo-direction movable limit direction, and the "N" inside the parentheses in the reference count value Cp(N) denotes the number of revolutions of the motor 210. For example, when the rotational phase of the motor 210 is at the reference phase in which the motor 210 has made four revolutions from the Lo-direction movable limit position, the reference count value Cp(4) is selected as the correct position count value Cp corresponding to the reference phase, and the position count value Cp is updated based on the reference count value Cp(4).

Figure 8:
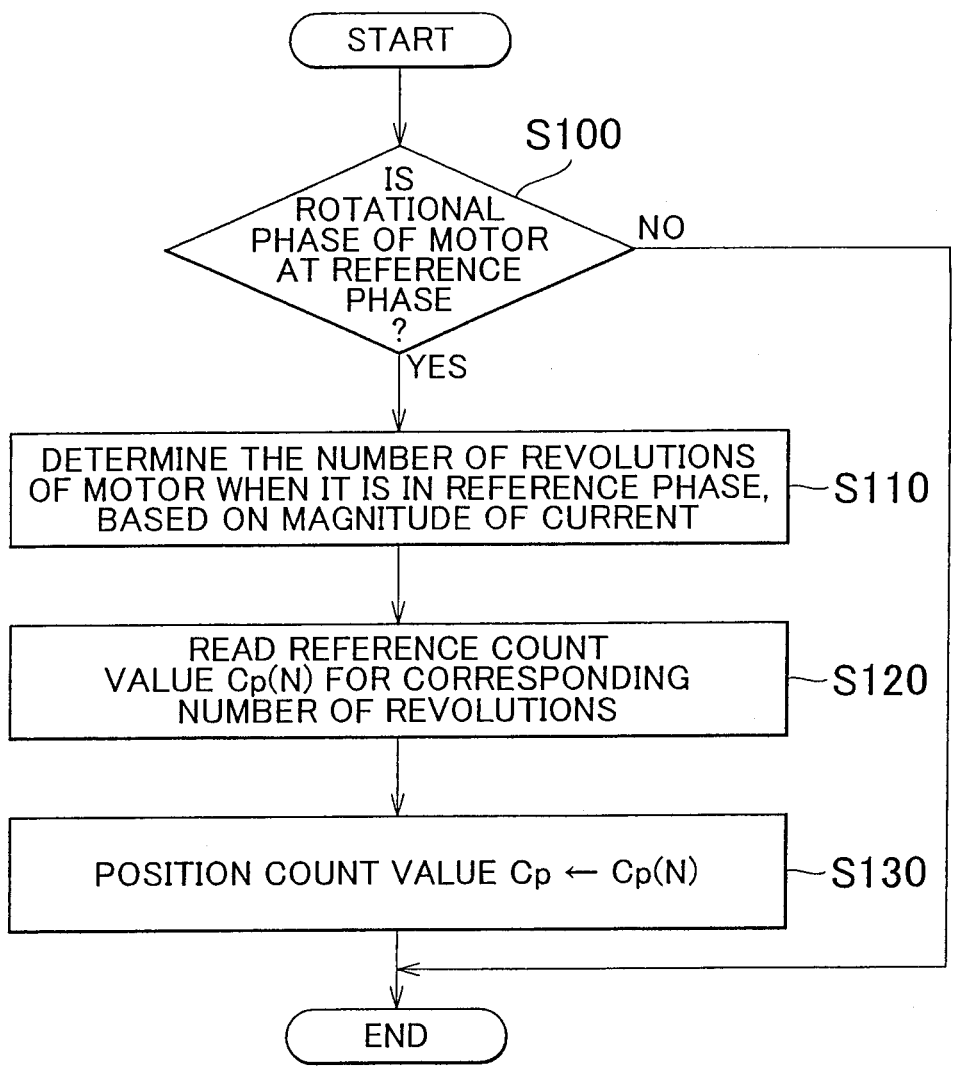
FIG. 8 is a flowchart illustrating the flow of a series of processing in a position count value updating routine according to one embodiment of the invention.

In the following, a position count value updating routine concerning updating of the position count value Cp will be specifically described with reference to FIG. 8. FIG. 8 is a flowchart illustrating the flow of a series of processing in the position count value updating routine. Also, the position count value updating routine is repeatedly executed at certain intervals or control cycles by the electronic control unit 100 during engine operation.

Upon start of the position count value updating routine, the electronic control unit 100 initially determines in step S100 whether the rotational phase of the motor 210 is at the reference phase, as shown in FIG. 8.

In this step, it is determined whether the rotational phase of the motor 210 is at the reference phase, by monitoring the relationship between change of the electric angle count value Ce and change of the pulse signals from the position sensors S4, S5.

When the motor 210 is in the reference phase in which the large magnetic pole 215b passes the position sensors S4, S5, the pulse signals generated from the position sensors S4, S5 undergo no changes over 22.5°, as indicated in the middle section of FIG. 5, and the relationship between change of the electric angle count value Ce and change of the pulse signals becomes different from the relationship observed when the motor 210 is in another rotational phase.

More specifically, in the rotational phases other than the reference phase, the pulse signal generated from the position sensor S4 changes at the same time that the electric angle count value Ce changes. In the reference phase, on the other hand, the pulse signal generated from the position sensor S4 does not change at the time that the electric angle count value Ce changes between "0" and "1", as indicated by the broken line in the middle section of FIG. 5.

In step S100, therefore, it is monitored or checked if the pulse signal generated from the position sensor S4 changed at the same time that the value of the electric angle count value Ce changed, and it is determined that the motor 210 is in the reference phase when the pulse signal generated from the position sensor S4 did not change at the time that the value of the electric angle count value Ce changed.

The method for determining whether the motor 210 is in the reference phase based on the pulse signals generated from the position sensors S4, S5 may be changed as needed. For example, the electronic control unit 100 may be configured to monitor the number of changes of the position count value Cp while the electric angle count value Ce changes by one count (e.g., from "1" to "2", from "5" to "0", etc. in the case of positive rotation, or from "5" to "4", from "0" to "5", etc. in the case of negative rotation). In this case, it is determined that the motor 210 is in the reference phase when the number of changes of the position count value Cp is less than four (4) while the electric angle count value Ce changes by one count.

Thus, it can be determined that the motor 210 is in the reference phase, by monitoring or checking the number of changes of the position count value Cp while the electric angle count value Ce changes by one count, for the following reason.

In the rotational phases other than the reference phase, the position count value Cp changes by four counts while the electric angle count value Ce changes by one count. On the other hand, in the reference phase in which the large magnetic pole 215b passes the position sensors S4, S5, the position count value Cp makes no change. Therefore, if the monitored change of the position count value Cp while the electric angle count value Ce changes by one count is less than four counts, it can be determined based on this fact that the monitor 210 is in the reference phase.

If it is not determined in step S100 that the rotational phase of the motor 210 is at the reference phase (step S100: NO), the electronic control unit 100 once finishes this routine.

If, on the other hand, it is determined in step S100 that the rotational phase of the motor 210 is at the reference phase (step S100: YES), the control proceeds to step S110, and determines the number of revolutions that have been made by the motor 210 from the Lo-direction movable limit position at the time when the motor 210 reached the reference phase determined in this cycle, based on the magnitude of the current applied to the motor 210.

Figure 9:
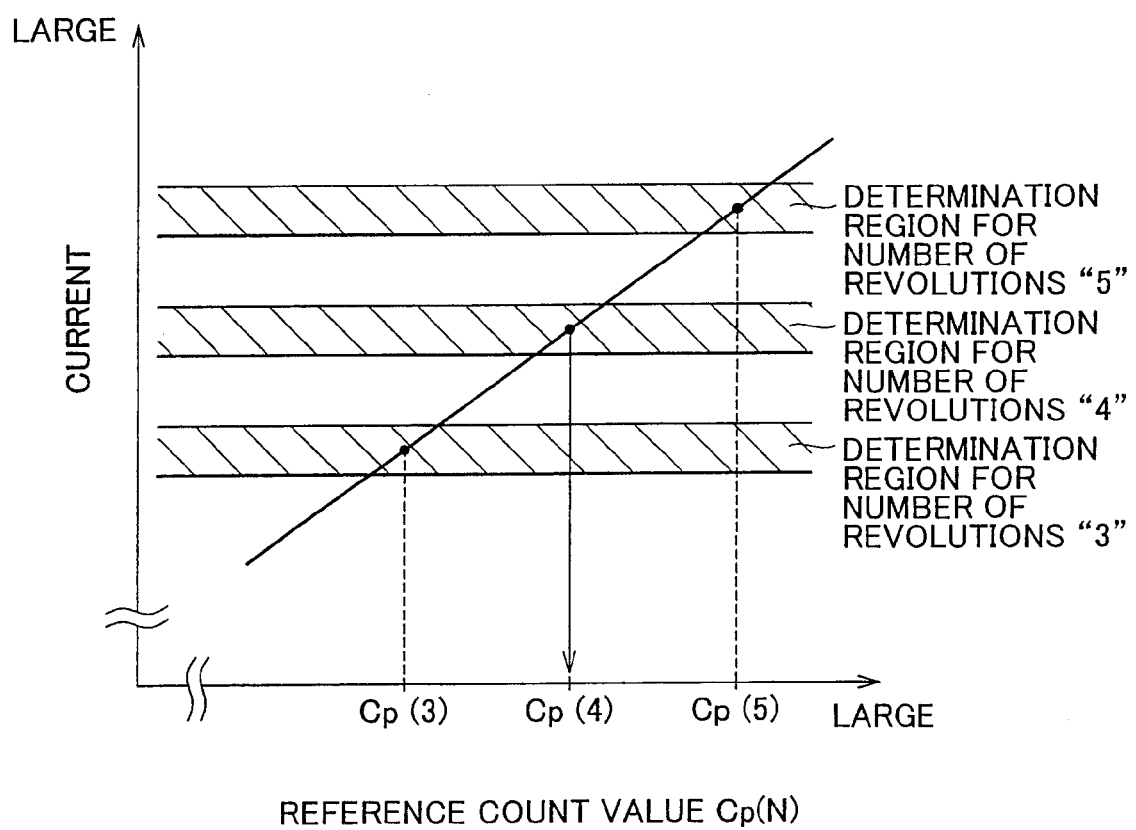
FIG. 9 is an explanatory view useful for explaining a method of selecting a reference count value used for updating, based on the magnitude of current, according to one embodiment of the invention.

More specifically, a plurality of determination regions are set which correspond to the respective numbers of revolutions of the motor 210, as shown in FIG. 9, and one of the determination regions in which the magnitude of the current applied to the motor 210 when the motor 210 is in the reference phase is included is determined. Then, the number of revolutions that have been made by the motor 210 from the Lo-direction movable limit position at the time when the motor 210 is in the reference phase detected in this cycle is determined, based on the determination region thus determined.

The straight line indicated in FIG. 9 indicates the relationship between the position of the output shaft 221 of the actuator 200 and the magnitude of the current applied to the motor 210. In view of variations in current value, each of the determination regions is set to a range delimited by upper and lower limits that are larger and smaller by a suitable degree than the value (point that lies on the solid line in FIG. 9) of current presumed to be applied to the motor 210 when the rotational phase of the motor 210 is at the reference phase. In the actuator 200 of this embodiment, the motor 210 is driven within the range corresponding to 10 revolutions, as described above; therefore, ten determination regions corresponding to the respective numbers of revolutions "1" to "10" are set. In FIG. 9, however, only three determination regions corresponding to the numbers of revolutions "3" to "5" are illustrated, for the sake of simplicity of explanation.

If the magnitude of the current applied to the motor 210 is included in the determination region corresponding to the number of revolutions "4" indicated in FIG. 9, for example, it is determined in step S110 that the motor 210 reaches the reference phase determined in this cycle when it has made four revolutions as counted from the Lo-direction movable limit position. Namely, in the position count value updating routine, the processing of step S110 corresponds to number-of-revolutions determining means.

Once the number of revolutions made by the motor 210 when it reaches the reference phase is determined (in step S110), the control proceeds to step S120, and the electronic control unit 100 reads the reference count value Cp(N) corresponding to the thus determined number of revolutions.

If it is determined in step S110 that the motor 210 reaches the reference phase when it has made four revolutions, for example, the electronic control unit 100 executes step S120 to read the reference count value Cp(4) corresponding to this number of revolutions as indicated by the arrow in FIG. 9.

Once the reference count value Cp(N) is read in the above manner, the control proceeds to step S130, and the electronic control unit 100 updates the position count value Cp based on the reference count value Cp(N), so that the position count value Cp coincides with the reference count value Cp(N) read in step S120.

After the position count value Cp is updated, the electronic control unit 100 once finishes the routine of FIG. 8. By repeatedly executing the position count value updating routine as described above, the position count value Cp is updated to a correct value each time the rotational phase of the motor 210 is brought into the reference phase. Therefore, even when the actual positions of the control shaft 340 and the output shaft 221 no longer correspond with the position count value Cp, the deviation of the position count value Cp from the correct value is promptly eliminated.

In this connection, the relationship between the magnitude of the current applied to the motor 210 and the reference count value Cp(N) as indicated in FIG. 9 may be changed due to chronological changes of the actuator 200 and the variable valve actuation mechanism 300, for example.

In view of the above situation, the electronic control unit 100 of this embodiment is configured to re-learn the relationship between the magnitude of the current and the reference count value Cp(N) as needed. It is to be noted that the reaction force acting on the control shaft 340 of the variable valve actuation mechanism 300 varies depending on engine operating conditions. Therefore, when the relationship between the magnitude of the current and the reference count value Cp(N) is re-learned, it is desirable to execute learning when the engine is in substantially the same operating conditions.

Thus, the electronic control unit 100 of this embodiment is configured to re-learn the relationship between the magnitude of the current and the reference count value Cp(N) on the condition that the engine is in predetermined operating conditions. More specifically, the oil temperature of the hydraulic oil supplied to the internal combustion engine, the engine speed NE, and the displacement speeds of the output shaft 221 and the control shaft 340 are set as parameters, and learning is executed on the condition that these values are within given ranges set as operating conditions under which learning is to be performed.

In this connection, the temperature of the hydraulic oil can be estimated based on the engine coolant temperature THW, an integrated value of the intake air amount GA, an integrated value of the engine speed NE, or the like, and the displacement speeds of the output shaft 221 and the control shaft 340 can be estimated based on the amount of displacement of the output shaft 221 per unit time, for example.

When each of the above-indicated parameters is within a given range set as an operating condition for learning, how the current applied to the motor 210 changes in accordance with displacement of the output shaft 221 is monitored, and the relationship between displacement of the output shaft and changes of the current is learned based on the pattern of changes of the current value during the displacement. Namely, the slope or gradient of the solid line indicated in FIG. 9 is re-learned based on changes of current during actual displacement of the output shaft 221.

Then, the relationship between the magnitude of the current applied to the motor 210 and the reference count value Cp(N) selected based on the current is corrected according to the learned slope of the straight line, so as to compensate for shifts in the relationship between the magnitude of the current and the reference count value Cp(N) due to chronological changes of the actuator 200 and the variable valve actuation mechanism 300, for example.

The illustrated embodiment of the invention provides the following effects. A first effect will be initially described. When it is determined that the motor 210 is in the reference phase, the position count value Cp is updated based on the reference count value Cp(N) stored in advance and corresponding to the reference phase in question, i.e., the reference count value Cp(N) stored as a value corresponding to a correct position count value Cp.

Therefore, when the position count value Cp grasped by the electronic control unit 100 deviates from the value corresponding to the actual position of the output shaft 221, namely, when the position of the output shaft 221 is controlled based on the erroneous position count value Cp, the position count value Cp is updated based on the reference count value Cp(N) when the motor 210 reaches the reference phase. Accordingly, when the rotational phase of the motor 210 comes to the reference phase, the discrepancy between the position count value Cp and the actual position of the output shaft 221 is eliminated.

In the case where the motor 210 makes a plurality of revolutions when controlling the position of the output shaft 221 as in the illustrated embodiment, the rotational phase of the motor 210 comes to the reference phase a plurality of times corresponding to the number of revolutions of the motor. Therefore, when the motor 210 is rotated a plurality of times (i.e., makes a plurality of revolutions) when controlling the position of the output shaft 221, the number of revolutions that have been made by the motor 210 when it is determined that the motor 210 is in the reference phase has to be determined; otherwise, the position of the output shaft 221 cannot be accurately estimated based on the determination.

In this embodiment, therefore, when it is determined that the motor 210 is in the reference phase, the number of revolutions that have been made by the motor 210 when the determination is made is determined based on the magnitude of the current applied to the motor 210 (step S110 in FIG. 8).

Thus, the number of revolutions that have been made by the motor 210 when the above determination is made can be determined, and the position count value Cp can be appropriately updated based on the reference count value Cp(N) corresponding to the number of revolutions of the motor 210.

In sum, with the arrangement of the illustrated embodiment, when it is determined that the motor 210 is in the reference phase, the position count value Cp is accurately updated based on the reference count value Cp(N) corresponding to the correct position count value Cp. It is thus possible to reduce or eliminate the possibility that the position of the output shaft 221 is controlled based on an erroneous position count value Cp, and that the position of the output shaft 221 fails to be appropriately controlled.

Next, a second effect of the illustrated embodiment will be described. The value of the current detected while the actuator 200 is being driven may vary to some extent depending on conditions under which the actuator 200 is used. If, on the other hand, a plurality of determination regions each extending over a given range with respect to the magnitude of the current applied to the motor 210 are set such that one determination region corresponds to each of the numbers of revolutions of the motor 210, as in the illustrated embodiment, the number of revolutions that have been made by the motor 210 when it is determined that the motor 210 is in the reference phase can be accurately estimated, by checking which one of the plurality of determination regions includes the magnitude of the current applied to the motor 210 when the above determination is made. Namely, even in the case where there are some degrees of variations in the magnitude of the current detected, the number of revolutions that have been made by the motor 210 when it is determined that the motor 210 is in the reference phase can be accurately estimated, based on the magnitude of the current applied to the motor 210.

Next a third effect of the illustrated embodiment will be described. If the arrangement of magnetic poles in a region of the rotor 213 corresponding to the reference phase is made different from the arrangement of magnetic poles in the other regions, as in the illustrated embodiment, the pattern of changes of the pulse signals generated from the position sensors S4, S5 when the motor 210 is in the reference phase differs from that observed when the motor 210 is in another rotational phase. Therefore, it can be determined that the rotational phase of the motor 210 is at the reference phase, by monitoring changes of the pulse signals.

Accordingly, it is possible to determine whether the rotational phase of the motor 210 is at the reference phase, without requiring a new sensor, or the like, for monitoring the rotational phase of the motor 210, thus avoiding or suppressing an increase in the cost due to provision of the new sensor, and complication of the manufacturing process due to mounting of the sensor.

Next, a fourth effect of the illustrated embodiment will be described. In the illustrated embodiment, the relationship between the magnitude of the current applied to the motor 210 and the reference count value Cp(N) stored in advance and corresponding to the reference phase is re-learned when the engine is in given operating conditions. Therefore, learning is executed on the condition that the engine is in substantially the same operating conditions, so that learning can be appropriately carried out without suffering from variations in the relationship between the magnitude of the current and the reference count value Cp(N) due to differences in the engine operating conditions.

Next, a fifth effect of the illustrated embodiment will be described. The lower the oil temperature of the hydraulic oil supplied to the internal combustion engine is, the higher the viscosity of the hydraulic oil supplied to the actuator 200 and the variable valve actuation mechanism 300, and further to the valve system of the internal combustion engine, etc., becomes. Therefore, as the oil temperature of the hydraulic oil supplied to the internal combustion engine is lower, the resistance that appears when the actuator 200 and the variable valve actuation mechanism 300 are driven becomes larger. Accordingly, the current applied to the motor 210 when it drives the output shaft 221 to the position corresponding to the reference count value Cp(N) increases as the oil temperature of the hydraulic oil supplied to the internal combustion engine is lower.

In the illustrated embodiment, on the other hand, the temperature of the hydraulic oil supplied to the internal combustion engine is monitored, as one of the parameters used when determining whether the engine is in the given operating conditions set for learning the relationship between the magnitude of the current and the reference count value Cp(N). Therefore, learning is executed on the condition that the temperature of the hydraulic oil is in a substantially equal condition, so that learning can be appropriately carried out without suffering from variations in the relationship between the magnitude of the current and the reference count value Cp(N) due to differences in the temperature of the hydraulic oil.

Next, a sixth effect of the illustrated embodiment will be described. As the engine speed NE is higher, and the frequency (the number of times) of opening of the intake valve 31 per unit time is higher, the reaction force acting on the control shaft 340 of the variable valve actuation mechanism 300 and the output shaft 221 of the actuator 200 under the bias force of the valve spring 24 increases. Therefore, as the engine speed NE is higher, the reaction force acting on the output shaft 221 of the actuator 200 increases, and the current applied to the motor 210 when the output shaft 221 is driven to the position corresponding to the reference count value Cp(N) increases.

In the illustrated embodiment, on the other hand, the engine speed NE is monitored, as one of the parameters used when determining whether the engine is in the given operating conditions set for learning the relationship between the magnitude of the current and the reference count value Cp(N). Therefore, learning is executed on the condition that the engine speed NE is in a substantially equal condition, so that learning can be appropriately carried out without suffering from variations in the relationship between the magnitude of the current and the reference count value Cp(N) due to differences in the engine speed NE.

Next, a seventh effect of the illustrated embodiment will be described. When the displacement speeds of the output shaft 221 of the actuator 200 and the control shaft 340 of the variable valve actuation mechanism 300 are high, the output shaft 221 and the control shaft 340 are driven at high speeds against the inertial force. Therefore, as the displacement speed is higher, electric power consumed for driving the output shaft 221 increases, and the current applied to the motor 210 when the output shaft 221 is driven to the position corresponding to the reference count value Cp(N) increases.

In the illustrated embodiment, on the other hand, the displacement speeds of the output shaft 221 and the control shaft 340 are monitored as one of the parameters used when determining whether the engine is in the given operating conditions set for learning the relationship between the magnitude of the current and the reference count value Cp(N). Therefore, learning is executed on the condition that the displacement speeds of the output shaft 221 and the control shaft 340 are in substantially equal conditions, so that learning can be appropriately carried out without suffering from variations in the relationship between the magnitude of the current and the reference count value Cp(N) due to differences in the displacement speeds of the output shaft 221 and the control shaft 340.

In this connection, since the output shaft 221 and the control shaft 340 are coupled integrally to each other, and are displaced by the same amount at the same time, there is no need to monitor the displacement speeds of both of the output shaft 221 and the control shaft 340, but the displacement speeds of the output shaft 221 and the control shaft 340 can be monitored by monitoring the displacement speed of only one of the output shaft 221 and the control shaft 340.

It is to be understood that the illustrated embodiment may be modified as needed, and the invention may be otherwise embodied in the following forms. In the illustrated embodiment, the rotational phase determining means is adapted to monitor the relationship between changes of the pulse signals generated from the position sensors S4, S5 and changes of the electric angle count value Ce, and the control device is configured to update the position count value Cp based on the reference count value Cp(N) each time it is determined that the rotational phase of the motor 210 is at the reference phase.

In a modified example of the above embodiment, the control device may be configured to compare the position count value Cp grasped by the electronic control unit 100 with the corresponding reference count value Cp(N) each time it is determined that the rotational phase of the motor 210 is at the reference phase, so as to obtain a deviation from the reference count value Cp(N), and update the position count value Cp based on the reference count value Cp(N) when the deviation of the position count value Cp from the reference count value Cp(N) is large.

Figure 10:
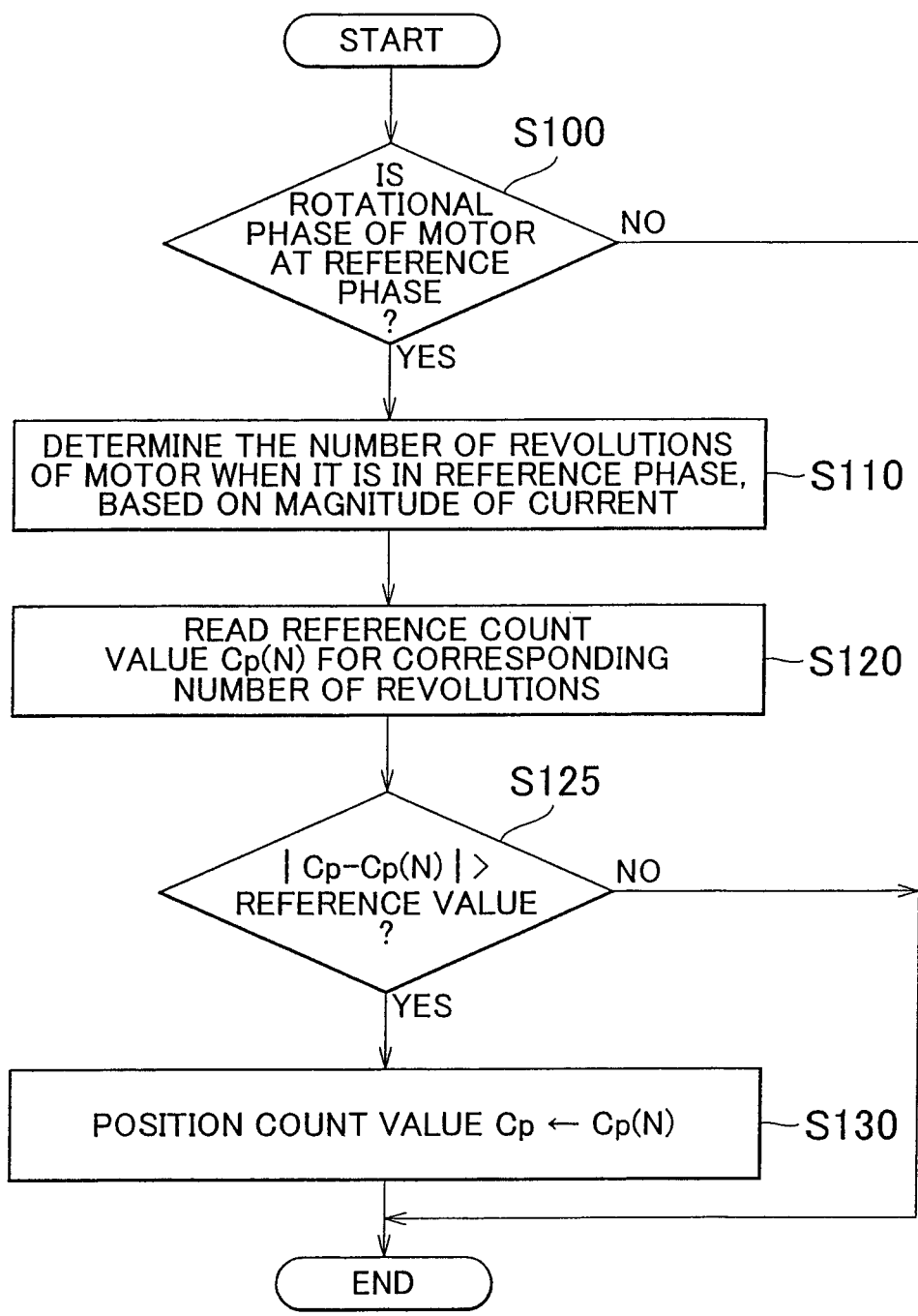
FIG. 10 is a flowchart illustrating the flow of a series of processing in a position count value updating routine, as a modified example of the embodiment of FIG. 8.

More specifically, step S125 as an operation to determine the magnitude of deviation of the position count value Cp from the reference count value Cp(N) is added to between step S120 and step S130 of the position count value updating routine, as shown in FIG. 10. Then, the position count value Cp is updated based on the reference count value Cp(N), only when it is determined in step S125 that the deviation of the position count value Cp from the reference count value Cp(N) is large.

In step S125 of the position count value updating routine illustrated in FIG. 10, an absolute value of a difference between the position count value Cp and the reference count value Cp(N) is calculated, and it is determined that the deviation of the position count value Cp from the reference count value Cp(N) is large when the absolute value is larger than a reference value. The specific method for determining whether the deviation of the position count value Cp from the reference count value Cp(N) is large may be changed as needed. Namely, the operation of step S125 may be modified provided that it can be determined that the position of the output shaft 221 grasped by the electronic control unit 100 deviates from the actual position of the output shaft 221, based on the fact that the position count value Cp deviates from the reference count value Cp(N).

If the control device is configured to update the position count value Cp only when the position count value Cp largely deviates from the reference count value Cp(N), the position count value Cp will not be updated when the position count value Cp does not largely deviate from the reference count value Cp(N).

Figure 11:
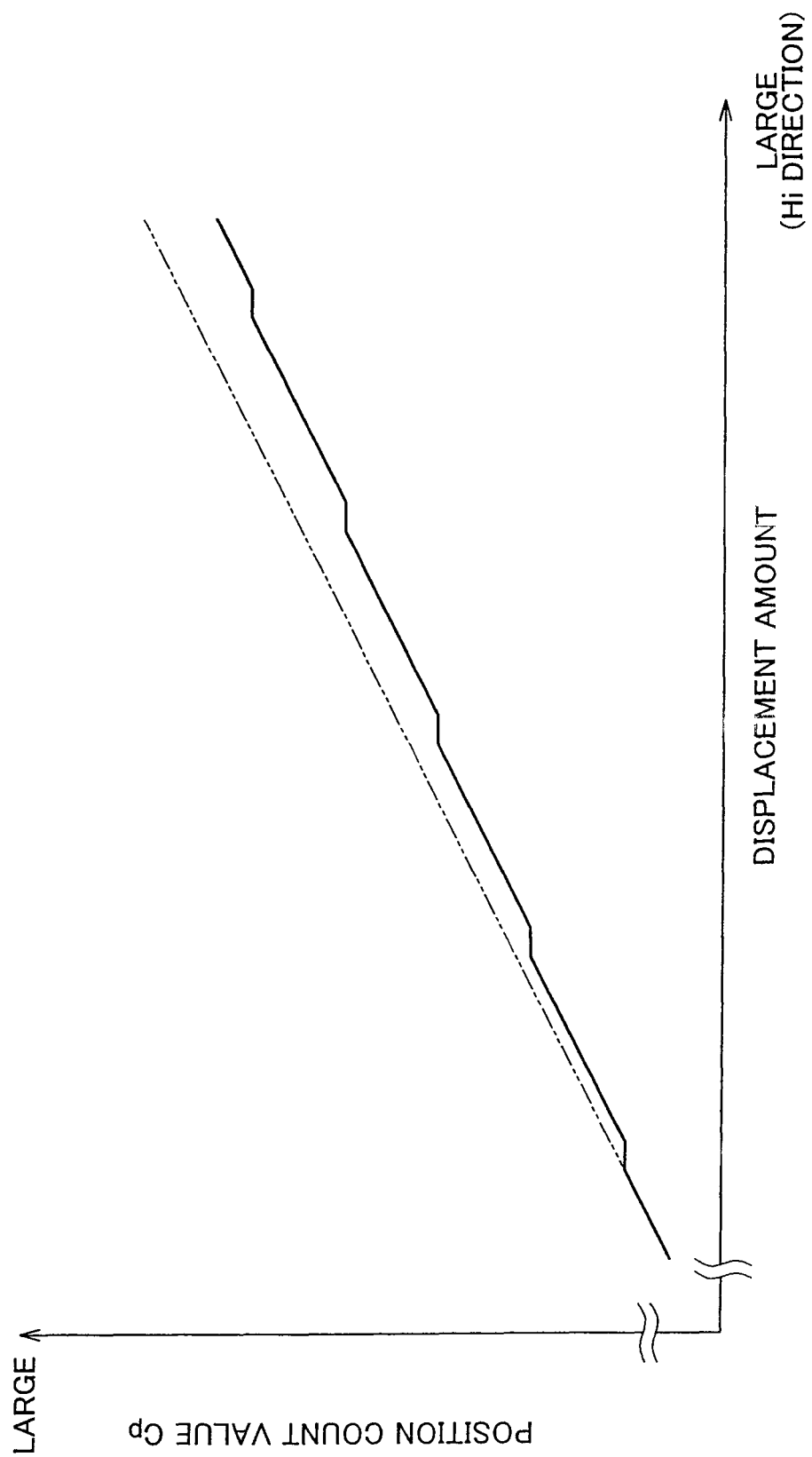
FIG. 11 is a graph indicating the relationship between the position count value and the amount of displacement of the output shaft, according to a modified example of the illustrated embodiment of the invention.

When the motor 210 passes the reference phase, the position count value Cp does not increase nor decrease, as indicated in the lower section of FIG. 5. Therefore, when the position count value Cp is not updated based on the reference count value Cp(N), the relationship between the position count value Cp and the amount of displacement of the output shaft 221 from the reference position deviates by increasing degrees from the proportional relationship as indicated by the two-dot chain line (FIG. 11) each time the motor 21 passes the reference phase, as indicated in FIG. 11.

In this case, the positions of the output shaft 221 and the control shaft 340 cannot be simply estimated from the value of the position count value Cp. Therefore, when the control device is configured to update the position count value Cp only when the deviation of the position count value Cp from the reference count value Cp(N) is large, as described above, there is a need to further add an arrangement for compensating for deviations of the position count value Cp, to the control device. As an example of the arrangement, the control device may be configured to add a correction value for correcting the position count value Cp for a given deviation that arises upon passage over the reference phase, to the position count value Cp, each time the motor 210 passes the reference phase. As another example of the arrangement, an operation map may be prepared in which the relationship between the amount of displacement from the reference position and the value of the position count value Cp as indicated by the solid line in FIG. 11 is stored, and the control device may be configured to calculate the position of the output shaft 221 from the position count value Cp by referring to the operation map.

In the illustrated embodiment, the oil temperature of the hydraulic oil supplied to the internal combustion engine, the engine speed NE, and the displacement speeds of the output shaft 221 and the control shaft 340 are set as parameters, or as operation conditions under which the relationship between the magnitude of the current and the reference count value Cp(N) is re-learned, and learning is executed on the condition that these values are within given ranges. On the other hand, the operating conditions under which learning is performed may be changed as appropriate, provided that learning can be carried out without suffering from variations in the relationship between the magnitude of the current and the reference count value Cp(N) caused by differences in the engine operating conditions.

Also, the learning operation as described above may be omitted, and the control device may be configured not to perform learning. In the illustrated embodiment, the multipole magnet 215 is provided with the large magnet pole 215b whose size is equivalent to that of three small magnet poles 215a. In the illustrated embodiment thus constructed, the pulse signals generated when the large magnetic pole 215b passes the position sensors S4, S5 change in different patterns from those of changes of the pulse signals generated when the motor 210 is in other rotational phases. This is one example of the configuration of the rotational phase determining means for determining that the rotational phase of the motor 210 comes to the predetermined rotational phase, based on the patterns of changes of the pulse signals generated from the position sensors S4, S5.

Therefore, the arrangement or construction of the multipole magnet 215, the mounting positions of the position sensors S4, S5, and so forth can be changed as appropriate, provided that it can be determined that the rotational phase of the motor 210 comes to the predetermined rotational phase, based on the patterns of changes of the pulse signals generated from the position sensors S4, S5.

In the illustrated embodiment, the rotational phase determining means is configured to determine that the rotational phase of the motor 210 is at the predetermined rotational phase, based on changes in the output patterns of the pulse signals of the position sensors S4, S5. On the other hand, the configuration of the rotational phase determining means may be changed as appropriate, provided that it can be determined that the rotational phase of the motor 210 is at the predetermined rotational phase. For example, a sensor that generates a signal when the motor 210 is in the predetermined rotational phase may be newly provided, and it may be determined that the rotational phase of the motor 210 is at the predetermined rotational phase, based on the signal generated from this sensor.

Also, the control device of the illustrated embodiment is configured to count the position count value Cp based on the pulse signals generated from the position sensors S4, S5 that are shifted in phase from each other. On the other hand, the arrangement of the position sensors for counting the position count value Cp may be changed as appropriate, provided that the position sensors can count the position count value Cp corresponding to the amount of displacement of the control shaft 340 from the reference position. For example, the mounting positions of the position sensors S4, S5, the number of position sensors, the number of magnetic poles of the multipole magnet 215, etc. may be changed.

Similarly, the mounting positions of the electric angle sensors S1, S2, S3 for setting the electric angle count value Ce, the number of electric angle sensors, the number of magnetic poles of the multipole magnet 214, etc. may be changed, provided that the motor 210 can be accurately controlled through switching of the energized phase of the motor 210.

In the illustrated embodiment, the control device of the actuator according to the invention is in the form of electronic control unit 100 that comprehensively controls the internal combustion engine including the variable valve actuation mechanism 300 for changing the operation angle and lift amount of the intake valve 31. However, the invention may also be applied to an internal combustion engine including a variable valve actuation mechanism that changes the operation angle and lift amount of the exhaust valve 41.

Also, the problem that the position of the output shaft is controlled based on an erroneous position count value occurs not only to the actuator 200 that drives the variable valve actuation mechanism 300 as described above, but may be similarly encountered in a control device of an actuator that counts the position count value Cp based on the rotational angle of the motor, and calculates the position of the output shaft relative to the reference position, based on the position count value Cp.

Therefore, the invention is not limitedly applied to the control device of the actuator that drives the variable valve actuation mechanism 300, but may be widely applied to a control device of an actuator that counts the position count value based on the rotational angle of the motor, and calculates the position of the output shaft relative to the reference position, based on the position count value.

The invention claimed is:

1. A control device of an actuator used in a condition where reaction force acting on an output shaft of the actuator increases as the output shaft is displaced in a direction in which a center axis of the output shaft extends, said actuator being adapted to convert rotary motion of a motor into linear motion of the output shaft and output the linear motion,
   wherein the control device detects a position of the output shaft by counting a position count value based on a pulse signal that is generated from a position sensor of the actuator in accordance with rotation of the motor of the actuator, the control device comprising:
   a rotational phase determining portion that determines that the motor is in a predetermined rotational phase;
   a number-of-revolutions determining portion that, when the determination is made by the rotational phase determining portion, determines the number of revolutions that have been made by the motor by the time when the determination is made by the rotational phase determining portion, based on a magnitude of current applied to the motor;
   a storage portion that stores a reference count value as a reference value of the position count value, the reference count value corresponding to the predetermined rotational phase; and
   an updating portion that, when the determination is made by the rotational phase determining portion, updates the position count value based on the reference count value, for each of the numbers of the revolutions that are determined by the number-of-revolutions determining portion.

2. The control device according to claim 1, wherein:
   a plurality of determination regions are set with respect to the magnitude of the current applied to the motor, such that each of the determination regions corresponds to each number of revolutions of the motor; and
   when the determination is made by the rotational phase determining portion, the number-of-revolutions determining portion determines the number of revolutions that have been made by the motor by the time when the determination is made by the rotational phase determining portion, depending on which of the determination regions includes the magnitude of the current applied to the motor.

3. The control device according to claim 1, wherein
   the rotational phase determining portion includes a rotor having a plurality of small magnetic poles comprising N poles and S poles that are alternately arranged at given angular intervals, and one large magnetic pole that extends over a larger angle than each of the small magnetic poles, wherein N poles and S poles are alternately arranged in the form of a circle, and two position sensors as said position sensor, which are mounted at positions that can be opposed to the respective magnetic poles, such that the position sensors are shifted in phase from each other; and
   the rotational phase determining portion counts the position count value based on the pulse signals that are respectively generated from the two position sensors in accordance with rotation of the motor, and determines that the rotational phase of the motor is at the predetermined rotational phase, based on change of the pulse signals detected when the large magnetic pole passes the position sensors.

4. The control device according to claim 1, wherein the control device controls the actuator for driving, via the output shaft, a control shaft of a variable valve actuation mechanism of an internal combustion engine coupled to the output shaft, in the direction in which the center axis extends, so that an operation angle and a lift amount of an engine valve are changed by the variable valve actuation mechanism.

5. The control device according to claim 4, wherein, when the internal combustion engine is in given operating conditions, the relationship between the magnitude of current applied to the motor and the reference count value is re-learned.

6. The control device according to claim 5, wherein a temperature of hydraulic oil supplied to the internal combustion engine is monitored as a parameter used when determining whether the internal combustion engine is in the given operating conditions.

7. The control device according to claim 5, wherein engine speed is monitored as a parameter used when determining whether the internal combustion engine is in the given operating conditions.

8. The control device according to claim 5, wherein displacement speeds of the output shaft and the control shaft are monitored as a parameter used when determining whether the internal combustion engine is in the given operating conditions.

9. The control device according to claim 1, wherein each time the rotational phase determining portion determines that the motor is in the predetermined rotational phase, the updating portion updates the position count value based on the reference count value, so that the position count value becomes equal to the reference count value corresponding to the predetermined rotational phase.

10. The control device according to claim 1, wherein each time the rotational phase determining portion determines that the motor is in the predetermined rotational phase, the updating portion compares the position count value grasped by the control device with the reference count value, so as to determine a deviation of the position count value from the reference count value, and updates the position count value based on the reference count value when the deviation is large, so that the position count value becomes equal to the reference count value corresponding to the predetermined rotational phase.

11. A method of controlling an actuator used in a condition where reaction force acting on an output shaft of the actuator increases as the output shaft is displaced in a direction in which a center axis of the output shaft extends, said actuator being adapted to convert rotary motion of a motor into linear motion of the output shaft and output the linear motion, the method comprising:
- detecting a position of the output shaft by counting a position count value based on a pulse signal that is generated from a position sensor of the actuator in accordance with rotation of the motor of the actuator;
- determining that the motor is in a predetermined rotational phase;
- when it is determined that the motor is in the predetermined rotational phase, determining the number of revolutions that have been made by the motor by the time when it is determined that the motor is in the predetermined rotational phase, based on a magnitude of current applied to the motor;
- storing a reference count value as a reference value of the position count value, the reference count value corresponding to the predetermined rotational phase; and
- when it is determined that the motor is in the predetermined rotational phase, updating the position count value based on the reference count value, for each of the numbers of the revolutions that are determined when it is determined that the motor is in the predetermined rotational phase.

* * * * *